United States Patent
Yonemoto et al.

(10) Patent No.: US 6,298,239 B1
(45) Date of Patent: Oct. 2, 2001

(54) INFORMATION TRANSMISSION CONTROL APPARATUS FOR TRANSMITTING SAME INFORMATION TO A PLURALITY OF DESTINATIONS, AND INFORMATION RECEPTION APPARATUS FOR RECEIVING INFORMATION FROM INFORMATION TRANSMISSION CONTROL APPARATUS

(75) Inventors: Yoshifumi Yonemoto, Osaka; Hidetaka Ohto, Takarazuka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/166,187

(22) Filed: Oct. 5, 1998

(30) Foreign Application Priority Data

Oct. 6, 1997 (JP) .................................................. 9-272491

(51) Int. Cl.[7] ...................................................... H04Q 7/20
(52) U.S. Cl. ........................ 455/466; 455/566; 455/458; 455/517; 340/7.47; 340/7.55
(58) Field of Search ..................................... 455/466, 556, 455/566, 458, 38.1, 38.3, 38.4, 38.5, 517; 340/825.44, 7.46, 7.47, 7.55; 707/531

(56) References Cited

U.S. PATENT DOCUMENTS

| | | |
|---|---|---|
| 3,643,220 | 2/1972 | Katagi . |
| 4,713,808 | 12/1987 | Gaskill et al. . |
| 5,382,949 * | 1/1995 | Mock et al. ..................... 340/825.44 |
| 5,404,391 | 4/1995 | Wavroch et al. . |
| 5,748,100 * | 5/1998 | Gutman et al. ................. 340/825.44 |
| 6,098,085 * | 8/2000 | Blonder et al. ...................... 707/531 |

FOREIGN PATENT DOCUMENTS

| | | |
|---|---|---|
| 654921 | 5/1995 | (EP) . |
| 7240731 | 9/1995 | (JP) . |
| 8275140 | 10/1996 | (JP) . |
| 9102435 | 2/1991 | (WO) . |
| 9202435 | 2/1991 | (WO) . |

* cited by examiner

Primary Examiner—William Trost
Assistant Examiner—Philip J. Sobutka
(74) Attorney, Agent, or Firm—Price and Gess

(57) ABSTRACT

An information transmission control apparatus for relaying information that allows a receiver's reply, from an information provider apparatus to a plurality of information reception apparatuses. The information transmission control apparatus sets different delay time for transmitting the information to each destination, based on random numbers or instructions from the information provider apparatus. Each time delay time for any of the destinations has elapsed, the information transmission control apparatus transmits the information to one or more information reception apparatuses that are the destination.

16 Claims, 22 Drawing Sheets

FIG. 3

```
1021
  HTTP/1.2
1022  Content-Direction: random
1023  Content-Type: text/html
1024  Content-Length: 305
1025
  <HTML><HEAD><TITLE>MOVIE INFORMATION</TITLE></HEAD><BODY>
  <CENTER>MOVIE INFORMATION</CENTER>
  <OL><LI>
  <A HREF="http://www.pana-srv.co.jp/movie/movie1.html">LATEST
  MOVIE PREVIEW</A>
  </LI><LI>
  <A HREF="http://www.pana-srv.co.jp/movie/movie2.html">AMERICAN
  MOVIE INFORMATION</A>
  </LI><LI>
  <A HREF="http://www.pana-srv.co.jp/movie/movie3.html">FRENCH
  MOVIE INFORMATION</A>
  </LI><LI>
  <A HREF="http://www.pana-srv.co.jp/movie/movie4.html">JAPANESE
  MOVIE INFORMATION</A>
  </LI></OL></BODY></HTML>
1026
```

FIG. 8

```
2021 — HTTP/1.2
2022 — Content-Direction: GroupB;Delay=10m
2023 — Content-Type: text/html
2024 — Content-Length: 305
2025

<HTML><HEAD><TITLE>MOVIE INFORMATION</TITLE></HEAD><BODY>
      <CENTER>MOVIE INFORMATION</CENTER>
      <OL><LI>
      <A HREF="http://www.pana-srv.co.jp/movie/movie1.html">LATEST
      MOVIE PREVIEW</A>
      </LI><LI>
      <A HREF="http://www.pana-srv.co.jp/movie/movie2.html">AMERICAN
      MOVIE INFORMATION</A>
      </LI><LI>
      <A HREF="http://www.pana-srv.co.jp/movie/movie3.html">FRENCH
      MOVIE INFORMATION</A>
      </LI><LI>
      <A HREF="http://www.pana-srv.co.jp/movie/movie4.html">JAPANESE
      MOVIE INFORMATION</A>
      </LI></OL></BODY></HTML>
                                                              2026
```

FIG. 11

| TIME (MINUTES) | INFORMATION TRANSMISSION CONTROL APPARATUS | INFORMATION RECEPTION APPRATUS A | INFORMATION RECEPTION APPRATUS B-1 | INFORMATION RECEPTION APPRATUS B-2 |
|---|---|---|---|---|
| 0 — | (BROADCAST TRANSMISSION) | (RECEPTION) (NOTIFICATION) (INFORMATION DISPLAY) | (RECEPTION) | (RECEPTION) |
| 10 — | | | (NOTIFICATION) (INFORMATION DISPLAY) | (NOTIFICATION) (INFORMATION DISPLAY) |

FIG. 13

```
3210
3211 — PUSH http://www.pana-gw.co.jp/gw.cgi HTTP/1.2
3212 — Destination-ID: 111-1111,111-2222,111-3333,111-4444,111-5555
3213 — Content-Type: text/html
3214 — Content-Length: 305

3215 ⎧ <HTML><HEAD><TITLE>MOVIE INFORMATION</TITLE></HEAD><BODY>
      │ <CENTER>MOVIE INFORMATION</CENTER>
      │ <OL><LI>
      │ <A HREF="http://www.pana-srv.co.jp/movie/movie1.html">LATEST
      │ MOVIE PREVIEW</A>
      │ </LI><LI>
      │ <A HREF="http://www.pana-srv.co.jp/movie/movie2.html">AMERICAN
      │ MOVIE INFORMATION</A>
      │ </LI><LI>
      │ <A HREF="http://www.pana-srv.co.jp/movie/movie3.html">FRENCH
      │ MOVIE INFORMATION</A>
      │ </LI><LI>
      │ <A HREF="http://www.pana-srv.co.jp/movie/movie4.html">JAPANESE
      │ MOVIE INFORMATION</A>
      ⎩ </LI></OL></BODY></HTML>
```

FIG. 16

3051 — HTTP/1.2
3052 — Content-Type: text/html
3053 — Content-Length: 305
3054

3055 {
<HTML><HEAD><TITLE>MOVIE INFORMATION</TITLE></HEAD><BODY>
<CENTER>MOVIE INFORMATION</CENTER>
<OL><LI>
<A HREF="http://www.pana-srv.co.jp/movie/movie1.html">LATEST
MOVIE PREVIEW</A>
</LI><LI>
<A HREF="http://www.pana-srv.co.jp/movie/movie2.html">AMERICAN
MOVIE INFORMATION</A>
</LI><LI>
<A HREF="http://www.pana-srv.co.jp/movie/movie3.html">FRENCH
MOVIE INFORMATION</A>
</LI><LI>
<A HREF="http://www.pana-srv.co.jp/movie/movie4.html">JAPANESE
MOVIE INFORMATION</A>
</LI></OL></BODY></HTML>
}

FIG. 19

```
4210
PUSH http://www.pana-gw.co.jp/gw.cgi HTTP/1.2          ← 4211
Destination-ID: GroupA,GroupB;Delay=10m,GroupC;Delay=20m  ← 4212
Content-Type: text/html                                ← 4213
Content-Length: 305                                    ← 4214

<HTML><HEAD><TITLE>MOVIE INFORMATION</TITLE></HEAD><BODY>
<CENTER>MOVIE INFORMATION</CENTER>
<OL><LI>
<A HREF="http://www.pana-srv.co.jp/movie/movie1.html">LATEST
MOVIE PREVIEW</A>
</LI><LI>
<A HREF="http://www.pana-srv.co.jp/movie/movie2.html">AMERICAN
MOVIE INFORMATION</A>
</LI><LI>
<A HREF="http://www.pana-srv.co.jp/movie/movie3.html">FRENCH
MOVIE INFORMATION</A>
</LI><LI>
<A HREF="http://www.pana-srv.co.jp/movie/movie4.html">JAPANESE
MOVIE INFORMATION</A>
</LI></OL></BODY></HTML>
                                                        ← 4215
```

INFORMATION TRANSMISSION CONTROL APPARATUS FOR TRANSMITTING SAME INFORMATION TO A PLURALITY OF DESTINATIONS, AND INFORMATION RECEPTION APPARATUS FOR RECEIVING INFORMATION FROM INFORMATION TRANSMISSION CONTROL APPARATUS

This application is based on an application No. 9-272491 filed in Japan, the content of which is hereby incorporated by reference.

BACKGROUND OF THE INVENTION

1. Field of the Invention

The present invention relates to an information transmission control apparatus for transmitting the same information to a plurality of destinations, and an information reception apparatus for receiving the information from the information transmission control apparatus. More specifically, the present invention relates to an information transmission control apparatus for relaying information sent through a channel from an information provider apparatus to a plurality of destinations, and an information reception apparatus for receiving the information and notifying the user of the information reception.

2. Description of the Prior Art

In information communication in the sophisticated information society today, the same information is often transmitted from an information provider to a plurality of receivers simultaneously via a wired or wireless channel. For instance, nowadays it is common for the information provider to transmit the same message to a plurality of pagers that have the same group ID. Such communication is generally referred to as broadcasting.

A representative of an information transmission control apparatus used for transmitting information from the information provider is a personal computer equipped with a communication facility, while a representative of an information reception apparatus for receiving the information and notifying the user of the reception is a portable telephone terminal, a personal computer, or a pager.

In conventional information reception apparatuses, the user is notified of the reception immediately after the information is received. Here, notification means, such as bell sound outputs and vibrations, are used. Then, the received information is displayed on a screen of each information reception apparatus.

If the received information allows or requires the user's reply, the user transmits his/her reply to the information provider using a certain communication means.

Thus, when a broadcast message that allows/requires a reply is transmitted from the information provider apparatus to the plurality of information reception apparatuses, a plurality of replies are likely to be returned to the information provider apparatus more or less at the same time. Such concentration of replies causes the load beyond the maximum instant processing capacity of the information provider apparatus, and results in a traffic jam or a breakdown in the communication lines.

In order to solve the above problem, Japanese Laid-Open Patent Application 8-275140 discloses a two-way program broadcast method, a two-way program response method, and a response apparatus. In this disclosure, when the users of the plurality of response apparatuses, which correspond to the plurality of information reception apparatuses described above, respond to received information, each response apparatus uses a different random number to delay the time of transmitting the response. By doing so, the plurality of responses are transmitted to the provider apparatus at different times.

Thus, even when the provider apparatus simultaneously transmits the same information to the plurality of response apparatuses and the users of the plurality of response apparatuses perform the response operation more or less at the same time, the responses are not returned to the provider apparatus all at once.

With the above technique, each response is transmitted to the provider apparatus after a different delay time period set using the random number has elapsed since the user's response operation. However, if the response is a request for further information, the user has to wait a long time before receiving the requested information from the provider apparatus, due to the time delay between the user's response operation and the response transmission.

Thus, the above conventional technique is effective when the communication ends with the user's response to the received information, but not effective when the user requests further information with the response. For example, the above technique is not suitable when a provider apparatus broadcasts a menu for available sets of information to a plurality of information reception apparatuses, and a user of each information reception apparatus selects one of the sets of information from the menu and returns a response that requests details of the selected set of information to the provider apparatus.

SUMMARY OF THE INVENTION

In view of the above problems, the present invention aims to provide a technique with which a plurality of replies to received broadcast information can be transmitted at different times, and with which the user who requests further information as a reply does not need to wait a long time before receiving the requested information.

That is to say, the present invention aims to provide an information transmission control apparatus and an information reception apparatus for avoiding simultaneous transmission of a plurality of replies, without using the method of setting the delay time between the user's reply operation and the actual transmission of the reply.

In order to fulfill the above object, the information transmission control apparatus of the present invention is an information transmission control apparatus for relaying broadcast information from an information provider apparatus to a plurality of information reception apparatuses, wherein the broadcast information allows a user of each of the plurality of information reception apparatuses to reply to the broadcast information, the information transmission control apparatus including: a memory; a reception unit for receiving the broadcast information from the information provider apparatus and storing the broadcast information into the memory; a delay time determination unit for determining transmission delay time for each of a plurality of destinations so that transmission delay time is different for at least two destinations, the transmission delay time being a time period that is to elapse before transmitting the broadcast information to each of the plurality of destinations, and each of the plurality of destinations being at least one of the plurality of information reception apparatuses; a delay time elapse detection unit for detecting whether the transmission delay time determined for each of the plurality of destinations has elapsed, after the broadcast information is received by the reception unit; and a transmission unit for transmitting, each time the delay time elapse detection unit detects that transmission delay time for one of the plurality of destinations has elapsed, the broadcast information to at least one information reception apparatus which is the destination.

With the above construction, the information transmission control apparatus transmits information received from the information provider apparatus to the plurality of information reception apparatuses at different times, so that the plurality of information reception apparatuses do not receive the information at the same time. Accordingly, a user of each information reception apparatus does not simultaneously make a reply to the received information. Also, the time delay is not set between the user's reply operation and the reply transmission in each information reception apparatus. Accordingly, when the reply requests further information, the user does not need to wait a long time before receiving the requested information.

Here, the information transmission control apparatus may further include a transmission specification information reception unit for receiving transmission specification information that is transmitted from the information provider apparatus along with the broadcast information, and for storing the transmission specification information into the memory, wherein the transmission specification information specifies the transmission delay time for each of the plurality of destinations, and wherein the delay time determination unit determines the transmission delay time for each of the plurality of destinations according to the transmission specification information.

With the above construction, the information transmission control apparatus sets the time of transmitting the information to each destination according to the transmission specification information. Thus, the information provider apparatus can instructs the information transmission control apparatus to delay the transmission to each destination for a specified time period so that overload caused by replies from the plurality of information reception apparatuses can be avoided.

Here, the broadcast information may be an HTML document including link information to other documents located on a WWW.

With the above construction, the information transmission control apparatus relays the HTML document from the information provider apparatus to the plurality of information reception apparatuses at different times. When the information provider apparatus intends to broadcast the HTML document whose link destination is the information provider apparatus itself, the simultaneous access from the plurality of information reception apparatuses to the information provider apparatus can be avoided if the HTML document is relayed by the information transmission control apparatuses.

Here, each of the plurality of destinations may be at least two of the plurality of information reception apparatuses, wherein, each time the delay time elapse detection unit detects that the transmission delay time for one of the plurality of destinations has elapsed, the transmission unit transmits the broadcast information to information reception apparatuses which are the destination.

With the above construction, the information transmission control apparatus transmits the information to the plurality of information reception apparatuses in units of groups at different times. Accordingly, when the information provider apparatus needs to broadcast the information to the large number of information reception apparatuses, the information provider apparatus can specify the appropriate transmission time delay for each group by sending the transmission specification information of the small size to the information transmission control apparatus.

Here, the delay time determination unit may include a random number generation unit for generating random numbers, wherein the delay time determination unit determines the transmission delay time for each of the plurality of destinations based on the random numbers generated by the random number generation unit.

With the above construction, the information transmission control apparatus sets the different transmission delay time for each destination using random numbers, so that the information provider apparatus does not need to specify the transmission delay time. Also, the transmission to the plurality of information reception apparatuses can be made evenly.

Here, each of the plurality of destinations may be at least two of the plurality of information reception apparatuses, wherein, each time the delay time elapse detection unit detects that the transmission delay time for one of the plurality of destinations has elapsed, the transmission unit transmits the broadcast information to information reception apparatuses which are the destination.

Here, the delay time determination unit may include: a transmission order determination unit for determining a transmission order for the plurality of destinations; and a time interval storage unit for storing a predetermined time period, wherein the delay time determination unit determines the transmission delay time for each of the plurality of destinations so that transmission delay time for an "n"th destination in the transmission order, among the plurality of destinations, is set at "(the predetermined time period)×(n−1)", "n" being an integer no less than 1.

With the above construction, the information transmission control apparatus transmits the information to the plurality of information reception apparatuses at fixed time intervals. As a result, it is highly likely that the receivers' replies to the received information will be evenly dispersed in a period of time.

Also, in order to fulfill the above objects, the information reception apparatus of the present invention is an information reception apparatus that receives broadcast information from an information transmission control apparatus and notifies a user of a reception of the broadcast information, wherein the broadcast information allows the user to reply to the broadcast information, the information reception apparatus including: a memory; a reception unit for receiving the broadcast information and storing the broadcast information into the memory; a unique information storage unit for storing unique information that differs to unique information of at least one of other information reception apparatuses which receive the broadcast information same as the information reception apparatus; a delay time determination unit for determining time based on the unique information; a delay time elapse detection unit for detecting whether the determined time has elapsed, after the broadcast information is received by the reception unit; and a notification unit for notifying the user of the reception of the broadcast information when the delay time elapse detection unit detects that the determined time has elapsed.

With the above construction, when the plurality of information reception apparatuses receive the same information simultaneously, there is a high possibility that one information reception apparatus notifies its user of the reception at a different time from the other information reception apparatuses. Accordingly, each user's reply to the received information will not be made at the same time.

Here, the time determined by the delay time determination unit may be changeable.

With the above construction, even when the plurality of information reception apparatuses simultaneously receive the same broadcast information, the time of notifying the user of the reception can be changed in each information reception apparatus. Accordingly, each user's reply to the received information will not be made simultaneously.

Here, the unique information may be a set of identification information, wherein the information reception apparatus receives delay specification information from the information transmission control apparatus along with the broadcast information, the delay specification information being at least one set of correspondence information between a set of specification information for specifying notification delay time and a set of identification information for identifying at least one information reception apparatus, the notification delay time being a time period that is to elapse before notifying a user of a reception of the broadcast information, wherein the information reception apparatus further includes a delay specification information reception unit for receiving the delay specification information from the information transmission control apparatus and storing the delay specification information into the memory, and wherein the delay time determination unit refers to the delay specification information and determines the time according to a set of specification information which corresponds to the set of identification information stored in the unique information storage unit.

With the above construction, each information reception apparatus sets the delay time for notifying the user of the information reception according to the delay specification information that was received along with the broadcast information from the information transmission control apparatus. Thus, by attaching the delay specification information with the broadcast information, the user of each information reception apparatus will be notified of the reception at different times.

Here, the broadcast information may be an HTML document including link information to other documents on a WWW.

With the above construction, the plurality of information reception apparatuses each notifies the user of the reception when the corresponding delay time has elapsed after receiving the HTML document. Accordingly, when the information transmission control apparatus broadcasts the HTML document whose link destination is the information transmission control apparatus itself, the simultaneous access from the plurality of information reception apparatuses to the information transmission control apparatus can be avoided.

Here, the information reception apparatus may further include a display unit for displaying the broadcast information after the notification unit notifies the user of the reception of the broadcast information.

With the above construction, even when the plurality of information reception apparatuses more or less simultaneously receive the same HTML document, the received information is displayed in the plurality of information reception apparatuses at different times. Accordingly, the plurality of information reception apparatuses will access to other HTML documents at different times. As a result, when a user of one information reception apparatus selects a menu item that links to another HTML document after receiving the information, that HTML document will be promptly displayed on the screen of the information reception apparatus.

Here, the delay time determination unit may include a random number generation unit for generating random numbers using the unique information, wherein the delay time determination unit determines the time based on one of the random numbers generated by the random number generation unit.

With the above construction, the information reception apparatus sets the notification delay time using one of the random numbers generated based on the unique information. There is a high possibility that this notification delay time is different from the other information reception apparatuses that received the same information at the same time as the information reception apparatus. As a result, each user's reply to the received information will be made at different times.

Here, the information reception apparatus may further include a delay specification information reception unit for receiving, when delay specification information is transmitted from the information transmission control apparatus along with the broadcast information, the delay specification information and storing the delay specification information into the memory, the delay specification information instructing the information reception apparatus to delay notifying the user of the reception of the broadcast information, wherein after the broadcast information is received by the reception unit, if the delay specification information is stored in the memory, the notification unit notifies the user of the reception when the delay time elapse detection unit detects that the determined time has elapsed, while if the delay specification information is not stored in the memory, the notification unit notifies the user of the reception without a time delay.

With the above construction, the information reception apparatus delays the notification of the information reception only when the received information was accompanied with the delay specification information. Thus, it is possible for the information transmitter to instruct each information reception apparatus whether to delay the notification.

Here, the broadcast information may be simultaneously transmitted from the information transmission control apparatus to a plurality of information reception apparatuses including the information reception apparatus.

Also, in order to fulfill the above objects, the information transmission control apparatus of the present invention is an information transmission control apparatus for transmitting broadcast information to a plurality of information reception apparatuses, wherein the broadcast information allows a user of each of the plurality of information reception apparatuses to reply to the broadcast information, the information transmission control apparatus including: a transmission information storage unit for storing the broadcast information; a delay specification information storage unit for storing delay specification information that specifies notification delay time for each of the plurality of information reception apparatuses, the notification delay time being a time period that is to elapse before each of the plurality of information reception apparatuses notifies the user of a reception of the broadcast information; and a transmission unit for transmitting the broadcast information stored in the transmission information storage unit and the delay specification information stored in the delay specification information storage unit to the plurality of information reception apparatuses.

With the above construction, the information transmission control apparatus transmits the broadcast information to the plurality of information reception apparatuses along with the delay specification information that specifies the notification delay time for each information reception apparatus. Accordingly, the users of the plurality of information reception apparatuses will not reply to the received broadcast information at the same time.

Here, the broadcast information may be an HTML document that includes link information to other documents located on a WWW.

Here, the transmission unit may simultaneously transmit the broadcast information and the delay specification information to the plurality of information reception apparatuses.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3 shows an example of the transmission data stored in the transmission data storage unit 1020;

FIG. 8 shows an example of the transmission data stored in the transmission data storage unit 1020;

FIG. 11 is a time chart showing the broadcast transmission by the information transmission control apparatus and the reception and notification by the plurality of information reception apparatuses;

FIG. 13 shows an example of the transmission data that is sent from the information provider apparatus 3200 to the information transmission control apparatus 3000;

FIG. 16 shows an example of the transmission data stored in the transmission data storage unit 3050;

FIG. 19 shows an example of the transmission data that is sent from the information provider apparatus 4200 to the information transmission control apparatus 4000;

DESCRIPTION OF THE PREFERRED EMBODIMENTS

The following is a detailed explanation of the embodiments of the present invention with reference to the figures.

First Embodiment

The following is an explanation of the information transmission control apparatus and the information reception apparatus of the first embodiment.

Figure 1:
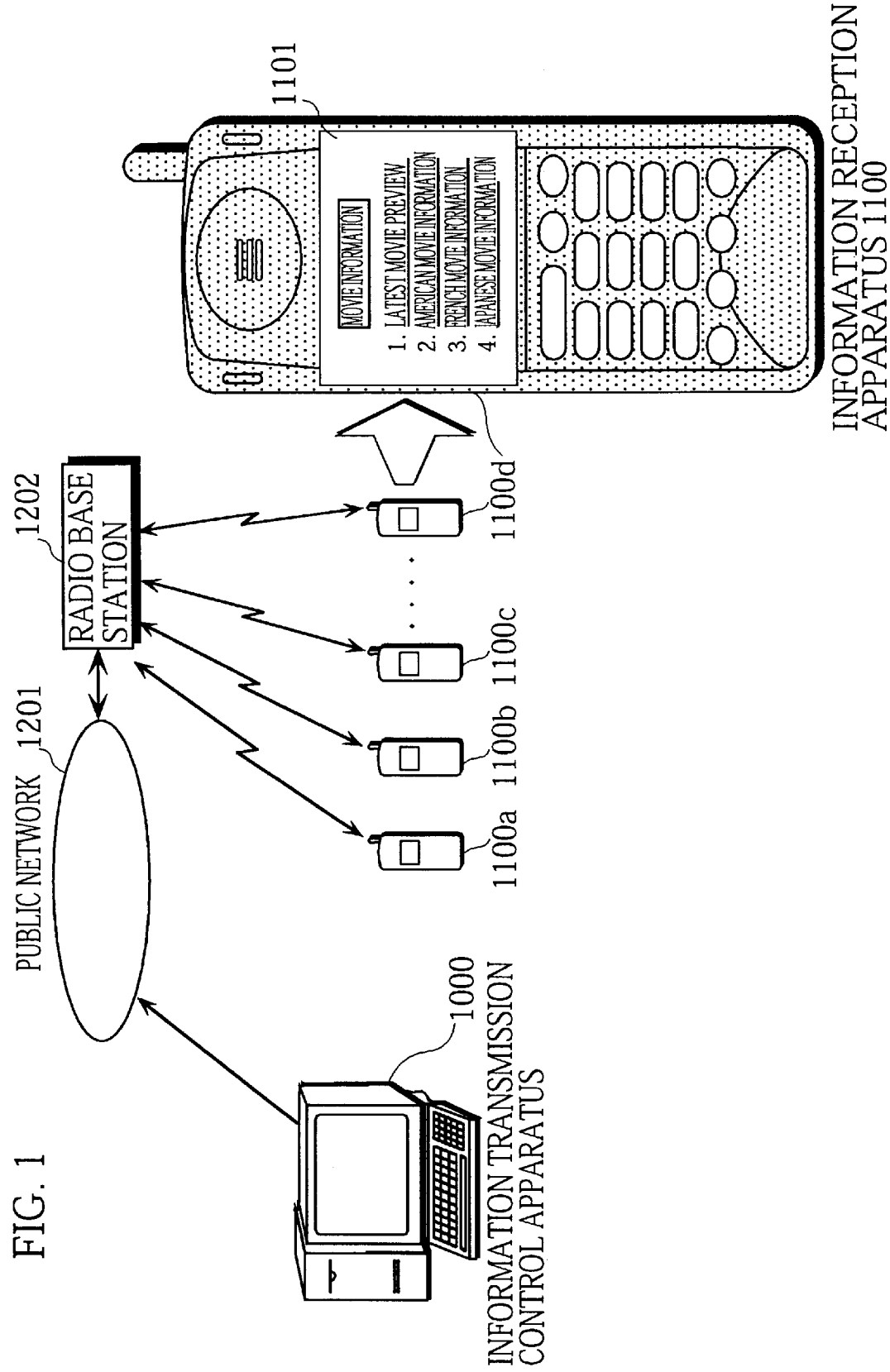
FIG. 1 shows a state when information is transmitted from the information transmission control apparatus to the plurality of information reception apparatuses of the first embodiment of the present invention.

FIG. 1 shows a state when information is transmitted from the information transmission control apparatus to the plurality of information reception apparatuses of the first embodiment.

In the figure, the information transmission control apparatus 1000 is linked to a public network 1201. Data is transmitted from the information transmission control apparatus 1000 to the plurality of information reception apparatuses 1100a, 1100b, 1000c, . . . , 1000d via the public network 1201 and a radio base station 1202 (hereinafter, the plurality of information reception apparatuses 1100a, 1100b, 1100c, . . . , 1100d are each referred to as "information reception apparatus 1100").

The plurality of information reception apparatuses 1100 have the same appearance which is shown in FIG. 1. Information sent from the information transmission control apparatus 1000 is displayed on a display screen 1101 in the information reception apparatus 1100.

The information transmission control apparatus 1000 and the information reception apparatus 1100 are explained in detail below.

<Information Transmission Control Apparatus>

Figure 2:
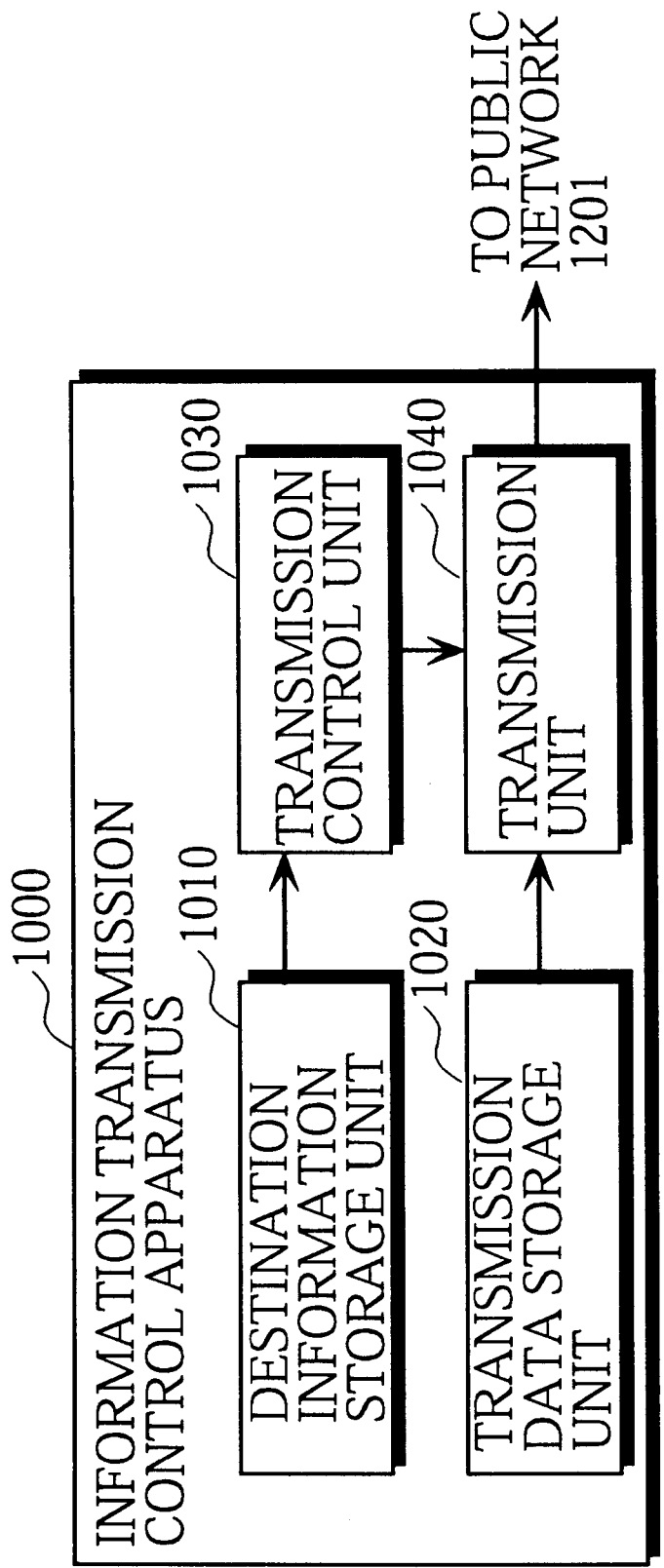
FIG. 2 shows the functional construction of the information transmission control apparatus 1000 of the first embodiment.

FIG. 2 shows the functional construction of the information transmission control apparatus 1000 of the first embodiment.

Here, the information transmission control apparatus 1000 is a personal computer that is linked to the public network 1201. Its hardware construction includes a CPU, a memory, and a hard disc. Also, its functional construction includes a destination information storage unit 1010, a transmission data storage unit 1020, a transmission control unit 1030, and a transmission unit 1040.

The destination information storage unit 1010 stores a destination information set showing a plurality of destinations, such as telephone numbers or group IDs.

The transmission data storage unit 1020 stores transmission data to be sent to the information reception apparatuses 1100.

The transmission unit 1040 outputs the transmission data stored in the transmission data storage unit 1020 to the public network 1201 through a modem or the like.

The transmission control unit 1030 controls the transmission unit 1040 to transmit the transmission data to the plurality of destinations, with reference to the destination information set in the destination information storage unit 1010.

With the above functional construction, the information transmission control apparatus 1000 more or less simultaneously broadcasts the transmission data to the plurality of information reception apparatuses 1100 via the public network 1201, in accordance with the destination information set stored in the destination information storage unit 1010.

The contents of the transmission data stored in the transmission data storage unit 1020 are explained next.

FIG. 3 shows an example of the transmission data in the transmission data storage unit 1020.

In this example, "HTTP/1.2" in line 1022 shows a version of HyperText Transfer Protocol (HTTP) used by the World Wide Web (WWW), for specifying such a data format as shown in the figure. Here, the version 1.2 shows an extension of the conventional HTTP.

"Content-Direction: random" in line 1023 specifies random processing of the transmission data in the information reception apparatus 1100. Here, the random processing means to randomly decentralize the time of notifying users of the reception in the respective information reception apparatuses 1100. This random processing is explained in greater detail later. Note here that there is no description in line 1023 if the random processing is not specified.

"Content-Type: text/html" in line 1024 shows that the text of the transmission data 1021 is an HTML (HyperText Mark-up Language) document.

"Content-Length: 305" in line 1025 shows that the text of the transmission data 1021 has 305 bytes.

Line group 1026 shows the text itself which shows a menu relating to movie information.

In the text, each tag "<A . . . >" shows a link to a different document located on the WWW.

The information displayed on the display screen 1101 in the information reception apparatus 1100 (see FIG. 1) is based on the text shown in line group 1026 in the transmission data 1021.

<Information Reception Apparatus>

(Construction)

Figure 4:
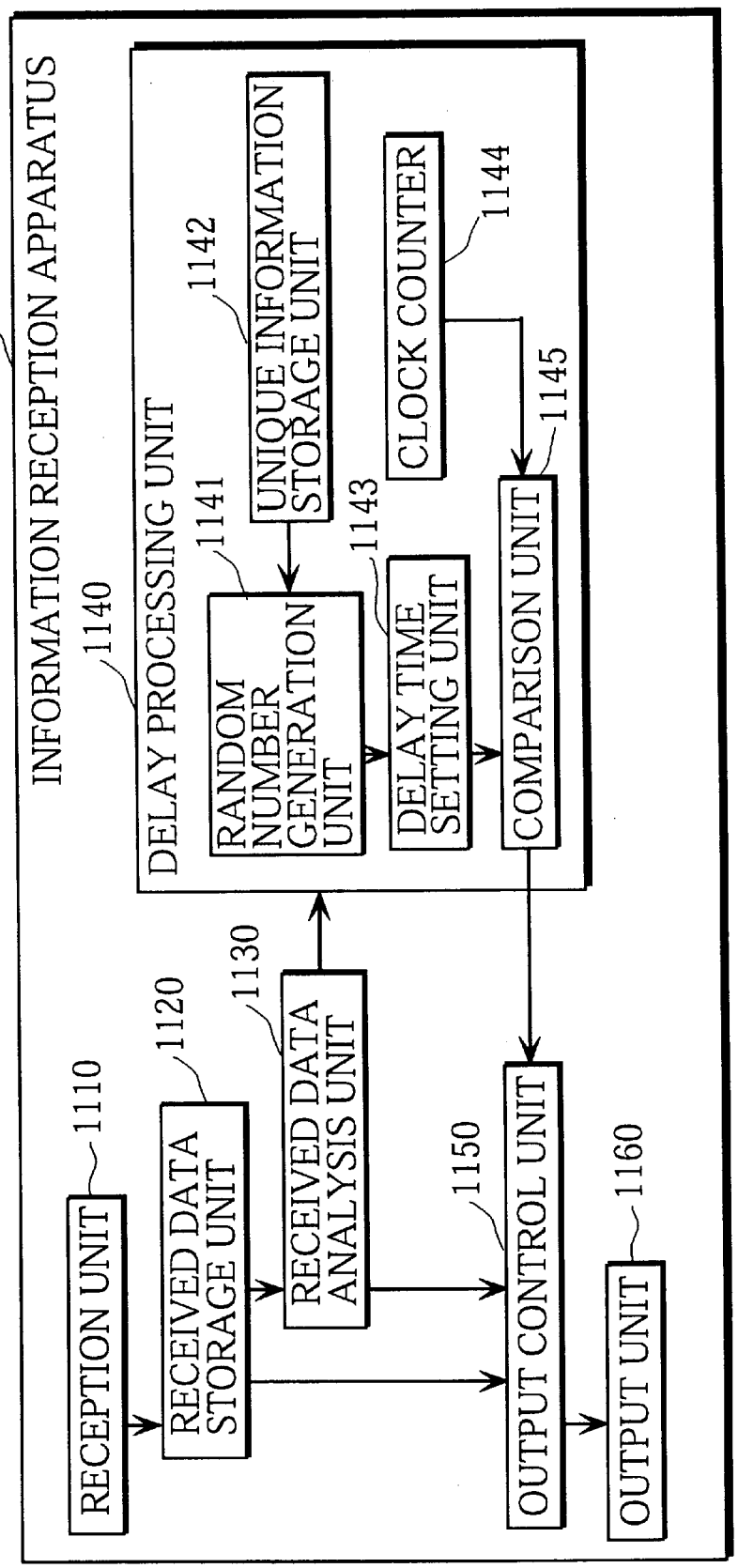
FIG. 4 shows the functional construction of the information reception apparatus 1100 of the first embodiment.

FIG. 4 shows the functional construction of the information reception apparatus 1100 of the first embodiment.

Here, the information reception apparatus 1100 is a portable remote terminal that operates as a browser to display received information according to the HTTP. The information reception apparatus 1100 functionally includes a reception unit 1110, a received data storage unit 1120, a received data analysis unit 1130, a delay processing unit 1140, an output control unit 1150, and an output unit 1160.

The reception unit 1110 is composed of an antenna, a high frequency unit, and a demodulator. Signals sent from the radio base station 1202 are received by the high frequency unit via the antenna and demodulated by the demodulator. As a result, the signals are converted to bit data and stored in the received data storage unit 1120.

The received data storage unit 1120 is made up of a memory.

The received data analysis unit 1130, the delay processing unit 1140, and the output control unit 1150 are composed of a clock signal generator, a CPU, and a memory and can be realized by the CPU executing a program stored in the memory.

The received data analysis unit 1130 analyzes the received bit data in the received data storage unit 1120 according to the HTTP and outputs an output instruction to the output control unit 1150. The received data analysis unit 1130 also activates the delay processing unit 1140, depending on the received data analysis result.

The output unit 1160 displays the received information on the display screen 1101, which is an LCD (liquid crystal display), in the information reception apparatus 1100. Here, the received information is displayed based on the HTML document that is the text of the transmission data sent from the information transmission control apparatus 1000.

The output control unit 1150 controls a bell or a vibrator to notify the user of the information reception and has the output unit 1160 display the received information.

The delay processing unit 1140 outputs an output instruction to the output control unit 1150 after delay time has elapsed since the activation of the delay processing unit 1140. The delay processing unit 1140 is composed of a random number generation unit 1141, a unique information storage unit 1142, a delay time setting unit 1143, a clock counter 1144, and a comparison unit 1145.

The random number generation unit 1141 generates pseudo-random numbers using unique information stored in the unique information storage unit 1142 as a seed, when the delay processing unit 1140 is activated by the received data analysis unit 1130.

The unique information storage unit 1142 has a memory which stores a unique value so that the random number generation unit 1141 will not generate random numbers of the same pattern as the other information reception apparatuses.

Thus, by assigning a unique value to each of the information reception apparatuses 1100, the user of one information reception apparatus will be notified of the information reception at a time that differs to at least one of the other information reception apparatuses. The unique value used here has been calculated, for example, based on the user's previous operations on the information reception apparatus 1100.

The delay time setting unit 1143 has a memory and sets delay time using one of the random numbers generated by the random number generation unit 1141, the delay time then being stored in the memory.

The clock counter 1144 counts how much time has elapsed since the activation of the delay processing unit 1140.

The comparison unit 1145 repeatedly compares the delay time stored in the delay time setting unit 1143 with the elapsed time in the clock counter 1144 and outputs an output instruction to the output control unit 1150 when the delay time has elapsed since the activation of the delay processing unit 1140.

Note here that the information reception apparatus 1100 also operates as a normal browser according to user operations.

(Operation)

The operation of the information reception apparatus 1100 with the above functional construction is explained below.

Figure 5:
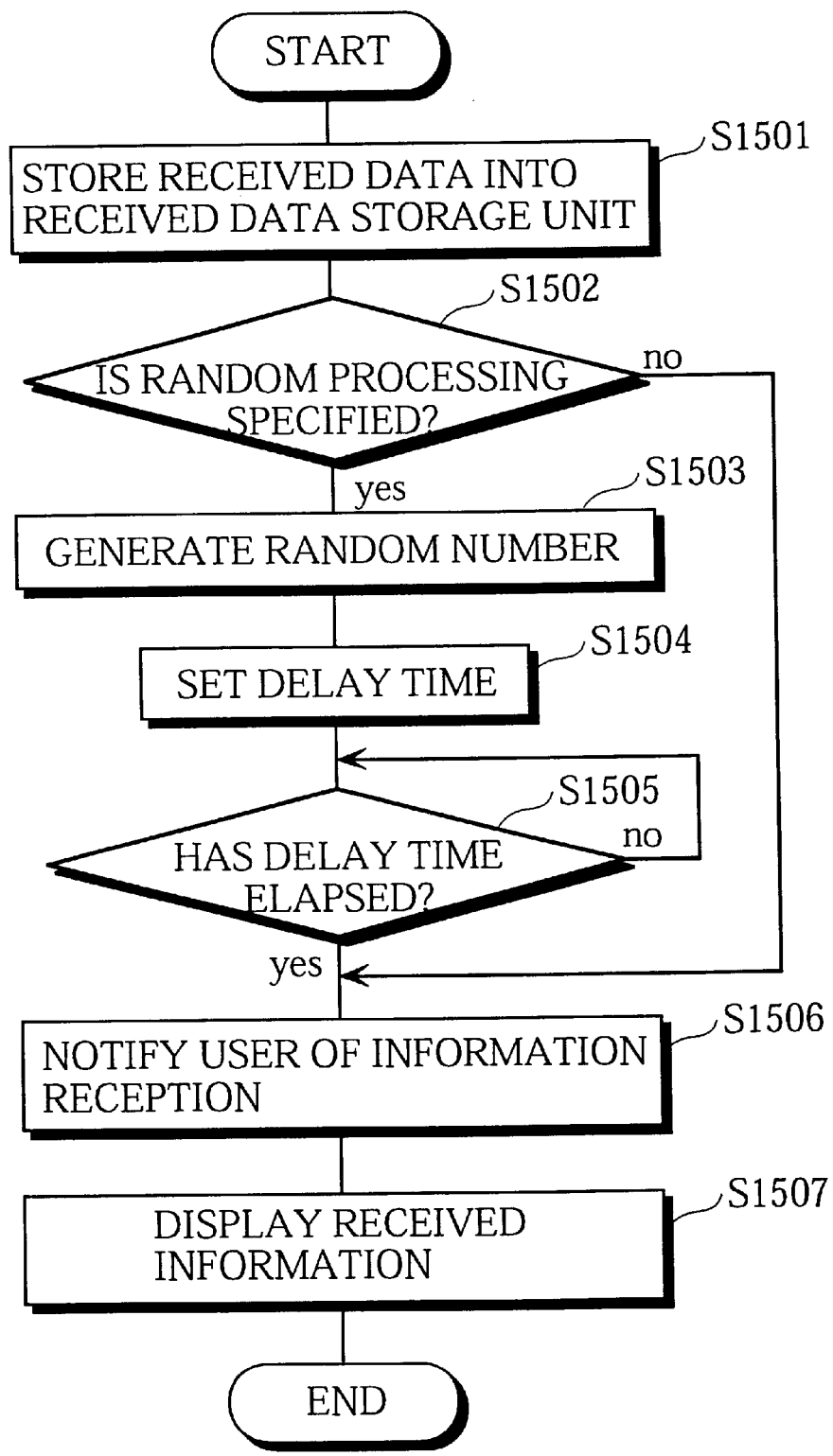
FIG. 5 is a flowchart showing the operation of the information reception apparatus 1100.

FIG. 5 is a flowchart showing the operation of the information reception apparatus 1100.

Here, the case is explained when the information reception apparatus 1100 receives the transmission data 1021 (shown in FIG. 3) from the information transmission control apparatus 1000.

First, the transmission data is received by the reception unit 1110 and stored in the received data storage unit 1120 (Step S1501). Here, the transmission data 1021 shown in FIG. 3 is stored in the received data storage unit 1120.

The received data analysis unit 1130 analyzes the received data according to the HTTP/1.2 to judge whether the random processing is specified (Step S1502). Here, since "Content-Direction: random" is written in the transmission data 1021, the received data analysis unit 1130 judges that the random processing is specified and accordingly activates the delay processing unit 1140.

On being activated, the delay processing unit 1140 has the random number generation unit 1141 generate random numbers using a unique value stored in the unique information storage unit 1142 as a seed (Step S1503). Here, the random numbers within the range from 0 to 1, such as 0.375, are generated.

The delay time setting unit 1143 calculates delay time from one of the random numbers generated by the random number generation unit 1141 and stores the calculated delay time (Step S1504). Here, the delay time is obtained by multiplying the random number by a predetermined value (1800 in the present example). Meanwhile, the clock counter 1144 counts the elapsed time per second.

After the delay time is stored in the delay time setting unit 1143, the comparison unit 1145 repeatedly compares the delay time with the clock counter 1144 to judge whether the delay time has elapsed since the activation of the delay processing unit 1140 (Step S1505).

For instance, if the random number 0.375 is multiplied by the predetermined value 1800 and the result 675 is stored in the delay time setting unit 1143 as the delay time, the comparison unit 1145 outputs an output instruction to the output control unit 1150 when the clock counter 1144 counts 675 seconds.

When the delay time (675 seconds) has elapsed (Step S1505), the output control unit 1150 notifies the user of the information reception by outputting bell sounds or producing vibrations (Step S1506), and has the output unit 1160 display the received information based on the data stored in the received data storage unit 1120 (Step S1507).

As a result, the menu relating to the movie information is displayed on the display screen 1101 as shown in FIG. 1.

If, on the other hand, the information reception apparatus 1100 receives transmission data that does not include the attribute "Content-Direction: random", the received data analysis unit 1130 judges that the random processing is not specified in Step S1502, bypasses Steps 1503–1505, and immediately outputs an output instruction to the output control unit 1150. Then, Steps S1506 and S1507 are processed by the output control unit 1150 without a time delay.

Thus, when the random processing is specified, each of the plurality of information reception apparatuses 1100 notifies the user of the information reception after corresponding delay time, which has been set at random from 0 to 1800 seconds, has elapsed from the information reception.

<Information Communication Timing>

Figure 6:
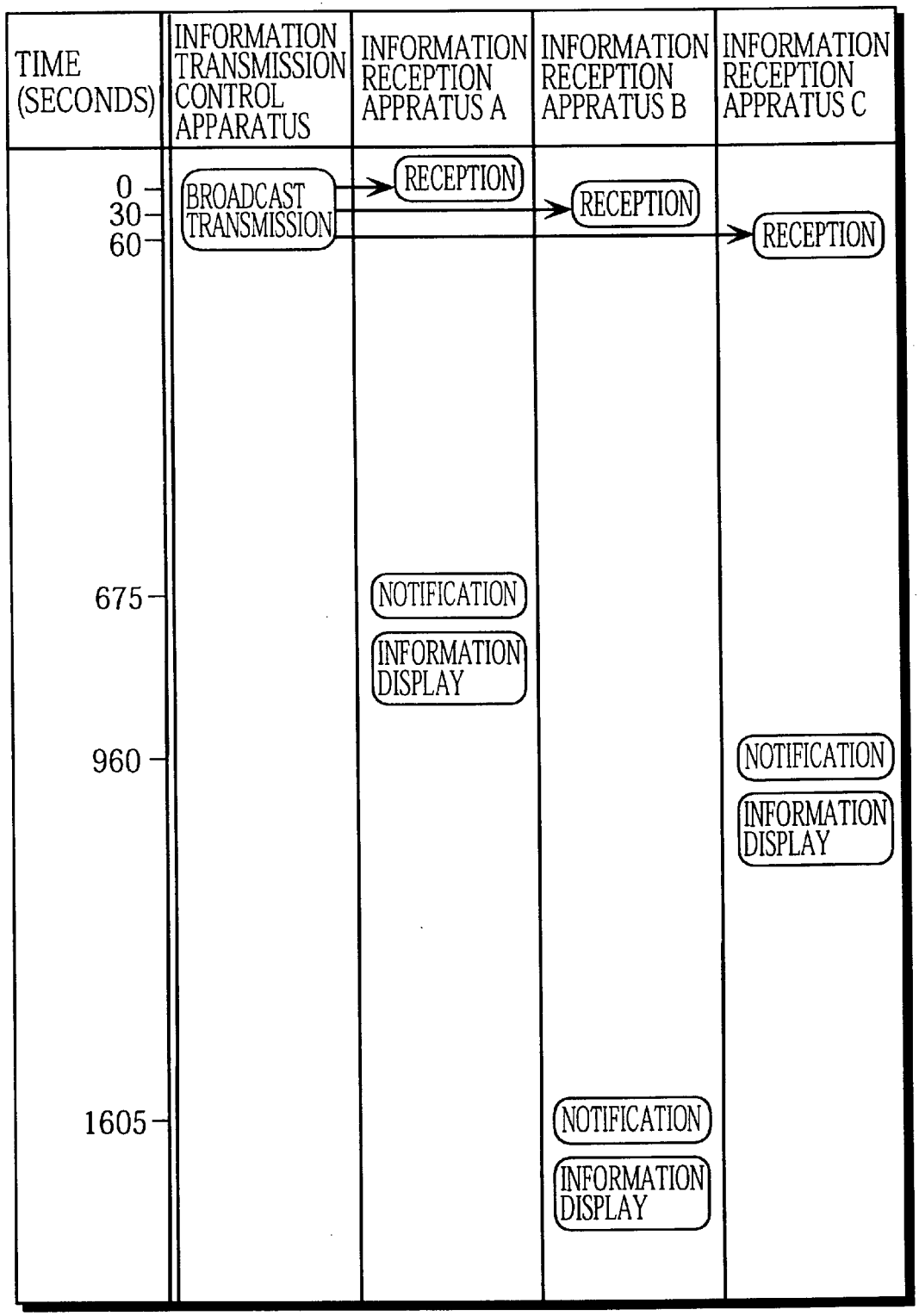
FIG. 6 is a time chart showing the broadcast transmission by the information transmission control apparatus and the reception and notification by the plurality of information reception apparatuses.

FIG. 6 is a time chart showing the broadcast transmission by the information transmission control apparatus and the reception and notification by the plurality of information reception apparatuses.

In the figure, the information transmission control apparatus broadcasts information to information reception apparatuses A, B, and C at little time intervals.

Note that the term "broadcast transmission" is used in this specification to indicate transmission of the same information to a plurality of reception apparatuses whether at the same time or at different times.

Also, the delay time in the information reception apparatus A is set at 675 seconds, the delay time in the information reception apparatus B is set at 1575 seconds, and the delay time in the information reception apparatus C is set at 900 seconds. Thus, the different delay time is set within the range from 0 to 1800 seconds using a random number in each information reception apparatus.

As shown in the figure, when the information transmission control apparatus transmits the same information to the plurality of information reception apparatuses more or less at the same time, the information is displayed in the plurality of information reception apparatuses at the different times.

For example, the menu relating to the movie information shown in FIG. 1 is displayed on the display screen and the user selects the menu item "1. Latest Movie Preview" as a reply that requests further information by operating a selection device, such as a button, equipped with the information reception apparatus. The information reception apparatus instantly starts operating as a normal browser to display an HTML document, located on the WWW, that is linked with the selected menu item.

Here, even when the users of the plurality of information reception apparatuses all select the menu item "1. Latest Movie Preview" as their replies, it is unlikely that these replies are made at the same time, because the users get the menu display at the different times. Accordingly, the load exceeding the server's instant processing capacity or the traffic jam/breakdown in the communication lines can be avoided.

Second Embodiment

The following is an explanation of the information transmission control apparatus and the information reception apparatus of the second embodiment of the present invention.

Figure 7:
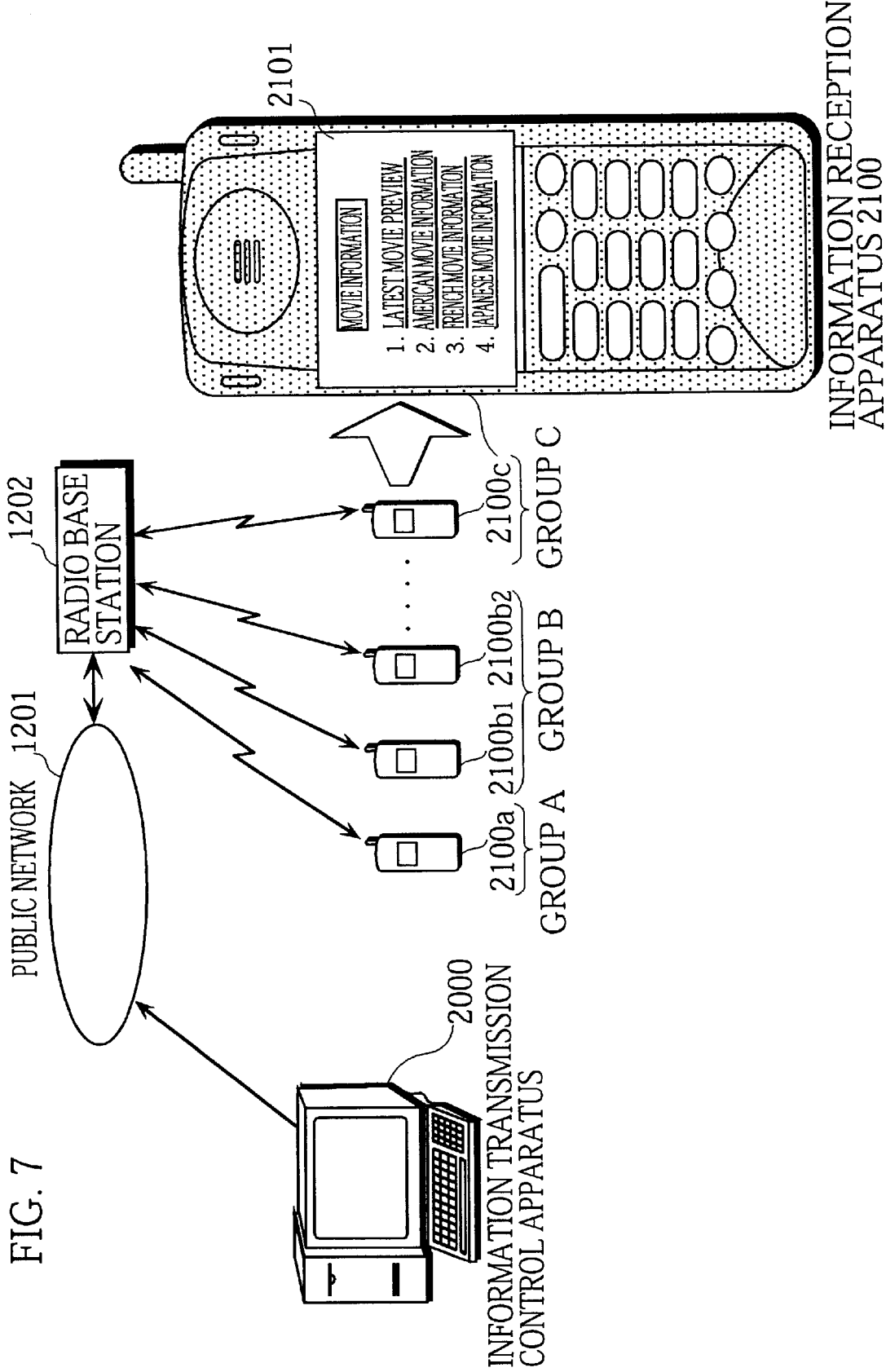
FIG. 7 shows a state when information is transmitted from the information transmission control apparatus to the plurality of information reception apparatuses of the second embodiment of the present invention.

FIG. 7 shows a state when information is transmitted from the information transmission control apparatus to the plurality of information reception apparatuses of the second embodiment.

The transmission state shown in FIG. 7 differs with the first embodiment shown in FIG. 1 in that the plurality of information reception apparatuses are classified into group A that includes an information reception apparatus 2100a, group B that includes information reception apparatuses 2100b 1 and 2100b 2, and group C that includes an information reception apparatus 2100c (hereinafter, the information reception apparatuses 2100a, 2100b 1, 2100b 2, . . . , 2100c are each simply referred to as "information reception apparatus 2100").

Information reception apparatuses 2100 that belong to the same group are simultaneously called to receive the information. Here, a group call service is provided by a radio call service provider, whereby information reception apparatuses of the same group can be called all at once with a single group number. The group call service is commonly used in the field of radio pagers.

<Information Transmission Control Apparatus>

The information transmission control apparatus 2000 of the second embodiment includes the destination information storage unit 1010, the transmission data storage unit 1020, the transmission control unit 1030, and the transmission unit 1040 same as the information transmission control apparatus 1000 of the first embodiment (see FIG. 2). The only difference with the first embodiment lies in that the transmission data storage unit 1020 of the information transmission control apparatus 2000 stores transmission data of a different type.

The contents of the transmission data stored in the transmission data storage unit 1020 of the information transmission control apparatus 2000 are explained below.

FIG. 8 shows an example of the transmission data stored in the transmission data storage unit 1020.

In transmission data 2021 shown in the figure, the contents in lines 2022, 2024, and 2025 and line group 2026 are the same as the transmission data 1021 in the first embodiment and are not explained here.

"Content-Direction GroupB;Delay=10 m" in line 2023 specifies a data processing method when the transmission data 2021 is received by the information reception apparatuses 2100. Specification contents are written after the mark ":". Here, it is specified that information reception apparatuses that belong to group B should notify the respective users of the reception 10 minutes after receiving the transmission data 2021. In "Delay=10 m", "m" indicates that the delay time is measured in minutes.

<Information Reception Apparatus>

(Construction)

Figure 9:
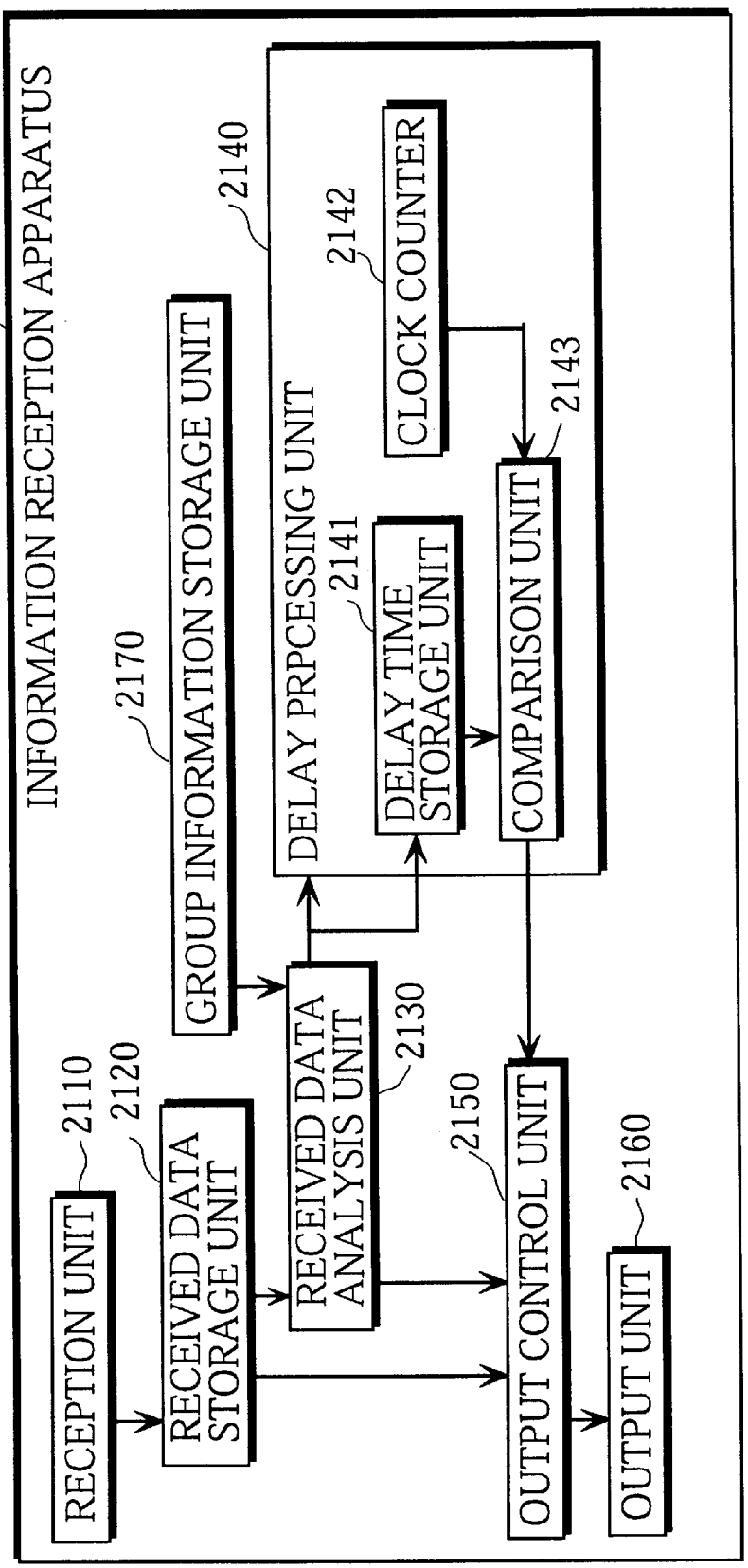
FIG. 9 shows the functional construction of the information reception apparatus 2100 of the second embodiment.

FIG. 9 shows the functional construction of the information reception apparatus 2100 of the second embodiment.

The information reception apparatus 2100 is a portable remote terminal that operates as a browser to display received information according to the HTTP. The information reception apparatus 2100 functionally includes a reception unit 2110, a received data storage unit 2120, a received data analysis unit 2130, a delay processing unit 2140, an output control unit 2150, an output unit 2160, and a group information storage unit 2170.

The reception unit 2110, the received data storage unit 2120, the output control unit 2150, and the output unit 2160 are the same as the reception unit 1110, the received data storage unit 1120, the output control unit 1150, and the output unit 1160 of the first embodiment and are not explained here.

The received data analysis unit 2130 is realized by a CPU executing a program stored in a memory. The received data analysis unit 2130 analyzes received data (bit data) stored in the received data storage unit 2120 according to the HTTP and outputs an output instruction to the output control unit 2150. The received data analysis unit 2130 also activates the delay processing unit 2140 and specifies the delay time, depending on the received data analysis result.

The group information storage unit 2170 is a nonvolatile memory that stores a group ID of a group to which the information reception apparatus 2100 belongs. This group ID is registered into the information reception apparatus 2100 by the user beforehand. When the information reception apparatus 2100 belongs to group B, the group information storage unit 2170 stores "GroupB" as its group ID.

The delay processing unit 2140 is activated by the received data analysis unit 2130 and outputs an output instruction to the output control unit 2150 after the delay time specified by the received data analysis unit 2130 has elapsed since the activation of the delay processing unit 2140. The delay processing unit 2140 itself includes a delay time storage unit 2141, a clock counter 2142, and a comparison unit 2143.

The delay time storage unit 2141 is a memory for storing the delay time specified by the received data analysis unit 2130.

The clock counter 2142 counts how much time has elapsed since the activation of the delay processing unit 2140. Here, the clock counter 2142 is incremented by 1 per minute.

The comparison unit 2143 repeatedly compares the delay time stored in the delay time storage unit 2141 with the elapsed time in the clock counter 2142 and outputs an output instruction to the output control unit 2150 when the delay time has elapsed since the activation of the delay processing unit 2140.

The information reception apparatus 2100 also operates as a normal browser according to user operations.

(Operation)

The operation of the information reception apparatus 2100 with the above functional construction is explained below.

Figure 10:
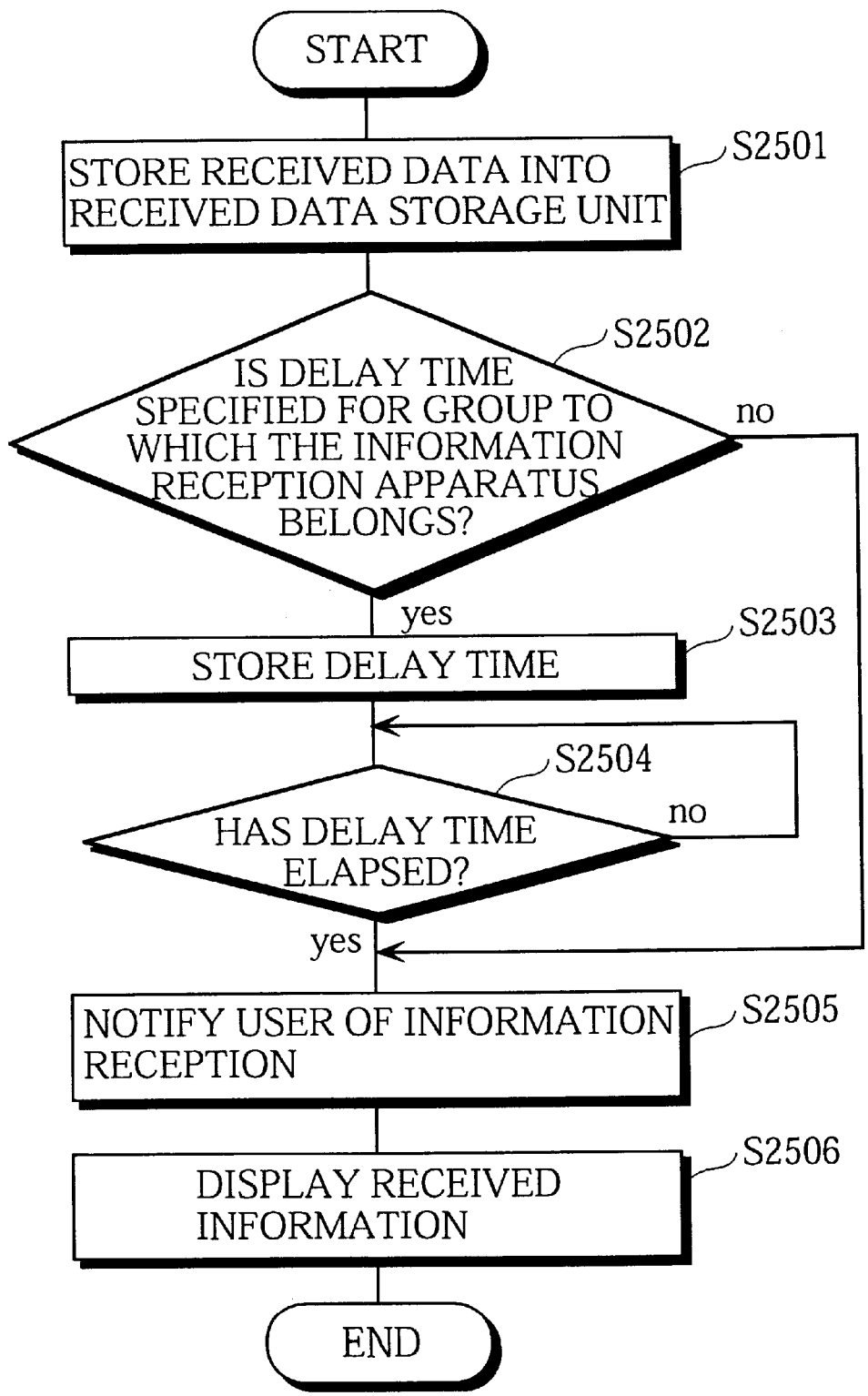
FIG. 10 is a flowchart showing the operation of the information reception apparatus 2100.

FIG. 10 is a flowchart showing the operation of the information reception apparatus 2100.

To Here, the case is explained when the transmission data 2021 shown in FIG. 8 is transmitted from the information transmission control apparatus 2000 to the information reception apparatus 2100 that belongs to group B.

First, the transmission data is received by the reception unit 2110 and stored in the received data storage unit 2120 (Step S2501). Here, the transmission data 2021 shown in FIG. 8 is stored in the received data storage unit 2120.

The received data analysis unit 2130 analyzes the received data in the received data storage unit 2120 according to the HTTP/1.2 to judge whether the delay time is specified for the group to which the information reception apparatus 2100 belongs (Step S2502). Here, since "Content-Direction: GroupB;Delay=10 m" is written in the transmission data 2021 and the group ID "GroupB" is stored in the group information storage unit 2170, the received data analysis unit 2130 activates the delay processing unit 2140 and specifies 10 minutes as the delay time.

On being activated, the delay processing unit 2140 stores the value 10 as the delay time into the delay time storage unit 2141 (Step S2503) and has the clock counter 2142 start counting from 0.

Next, the comparison unit 2143 repeatedly compares the delay time with the clock counter 2142 to judge whether the delay time has elapsed since the activation of the delay processing unit 2140 (Step S2504).

When the delay time (10 minutes) has elapsed (Step S2504), the comparison unit 2143 outputs an output instruction to the output control unit 2150. The output control unit 2150 notifies the user of the information reception by outputting bell sounds or producing vibrations (Step S2505), and has the output unit 2160 display the received information based on the bit data stored in the received data storage unit 2120 (Step S2506).

As a result, the menu relating to the movie information is displayed on a display screen 2101 as shown in FIG. 7.

If, on the other hand, the information reception apparatus 2100 belongs to group A, the received data analysis unit 2130 judges that the delay time is not specified in Step S2502, bypasses Steps S2503 and S2504, and immediately outputs an output instruction to the output control unit 2150. Then, Steps S2505 and S2506 are processed by the output control unit 2150 without a time delay.

Thus, when delay time is specified for a particular group, each information reception apparatus 2100 that belongs to the group notifies the user of the information reception after the specified delay time has elapsed.

<Information Communication Timing>

FIG. 11 is a time chart showing the broadcast transmission by the information transmission control apparatus and the reception and notification by the plurality of information reception apparatuses.

In the figure, the information transmission control apparatus broadcasts the transmission data 2021 shown in FIG. 8 to information reception apparatuses A, B-1, and B-2 almost simultaneously. The information reception apparatus A belongs to group A, while the information reception apparatuses B-1 and B-2 belong to group B.

As shown in FIG. 11, the information reception apparatus A notifies the user of the reception immediately after it receives the transmission data 2021, while the information reception apparatuses B-1 and B-2 notify the respective users of the reception 10 minutes after receiving the transmission data 2021.

Thus, when the information transmission control apparatus transmits the same information to the plurality of information reception apparatuses more or less at the same time, users of information reception apparatuses that belong to the same group are notified of the information reception at a time which is different from at least one of the other groups.

Accordingly, it can be avoided for users of all groups to request further information at the same time.

Third Embodiment

The following is an explanation of the information transmission control apparatus of the third embodiment of the present invention.

Figure 12:
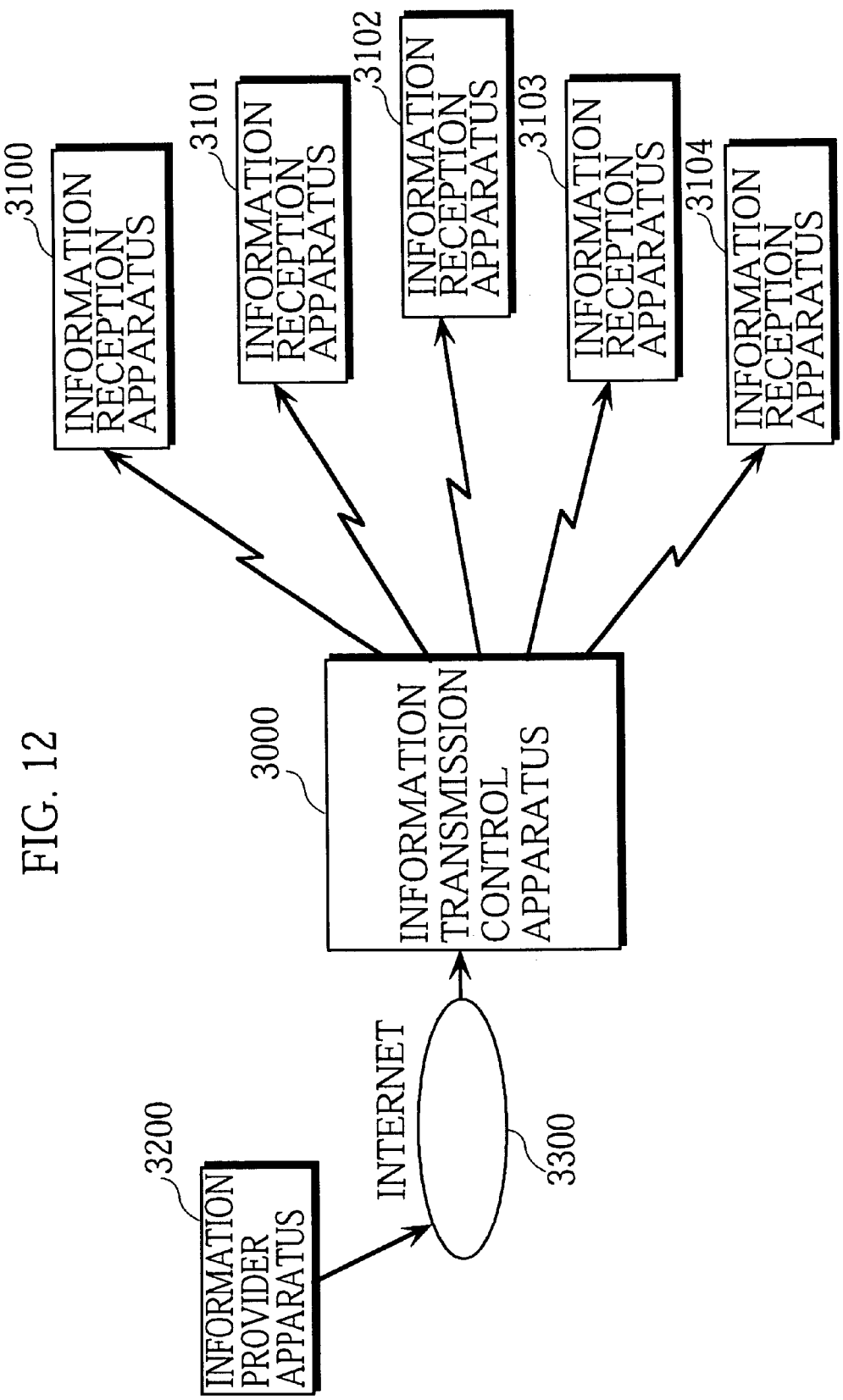
FIG. 12 shows a state when information from the information provider apparatus is transmitted to the plurality of information reception apparatuses via the information transmission control apparatus of the third embodiment of the present invention.

FIG. 12 shows a state when the information transmission control apparatus of the third embodiment relays information from an information provider apparatus to a plurality of information reception apparatuses.

Here, the information is transmitted from the information provider apparatus 3200 to the plurality of information reception apparatuses 3100–3104 in the directions of the arrows shown in the figure.

The information provider apparatus 3200 sends broadcast information and a broadcast instruction to the information transmission control apparatus 3000 via an internet 3300. The information transmission control apparatus 3000 operates as a relay server for broadcasting the received information to the information reception apparatuses 3100–3104 via a public telephone network or by radio.

The information reception apparatuses 3100–3104 are each a general-purpose personal computer or a portable remote terminal that operates as a browser to display the received information according to the HTTP.

The information provider apparatus 3200 and the information transmission control apparatus 3000 are explained in detail below.

<Information Provider Apparatus>

The information provider apparatus 3200 is a personal computer or the like that sends transmission data to the information transmission control apparatus 3000 via the internet 3300, the transmission data including information to be broadcast to the plurality of information reception apparatuses 3100–3104 and a destination information set.

FIG. 13 shows an example of the transmission data sent from the information provider apparatus 3200 to the information transmission control apparatus 3000.

In the figure, transmission data 3210 roughly conforms to the HTTP but further includes "PUSH" and "Destination-ID".

"PUSH" in line 3211 shows a PUSH method for indicating relay transmission of the transmission data 3210. In "PUSH http://www.pana-gw.co.jp/gw.cgi HTTP/1.2" in line 3211, "www.pana-gw.co.jp" shows a host name of the information transmission control apparatus 3000 that is the relay server, "gw.cgi" shows a name of a control program stored in the information transmission control apparatus 3000, and "HTTP/1.2" shows a version of the HTTP. The relay transmission of the information transmission control apparatus 3000 is realized by executing the above control program.

"Destination-ID: 111–1111, 111–22222, 111–3333, 111–4444, 111–5555" in line 3212 shows a destination information set including five telephone numbers each as destination information.

"Content-Type: text/html" in line 3213 shows that the text of the transmission data 3210 is an HTML document.

"Content-Length: 305" in line 3214 shows that the text has 305 bytes.

Line group 3215 shows the text itself which shows a menu relating to movie information. This menu is the same as that used in the first and second embodiments.

<Information Transmission Control Apparatus>

(Construction)

Figure 14:
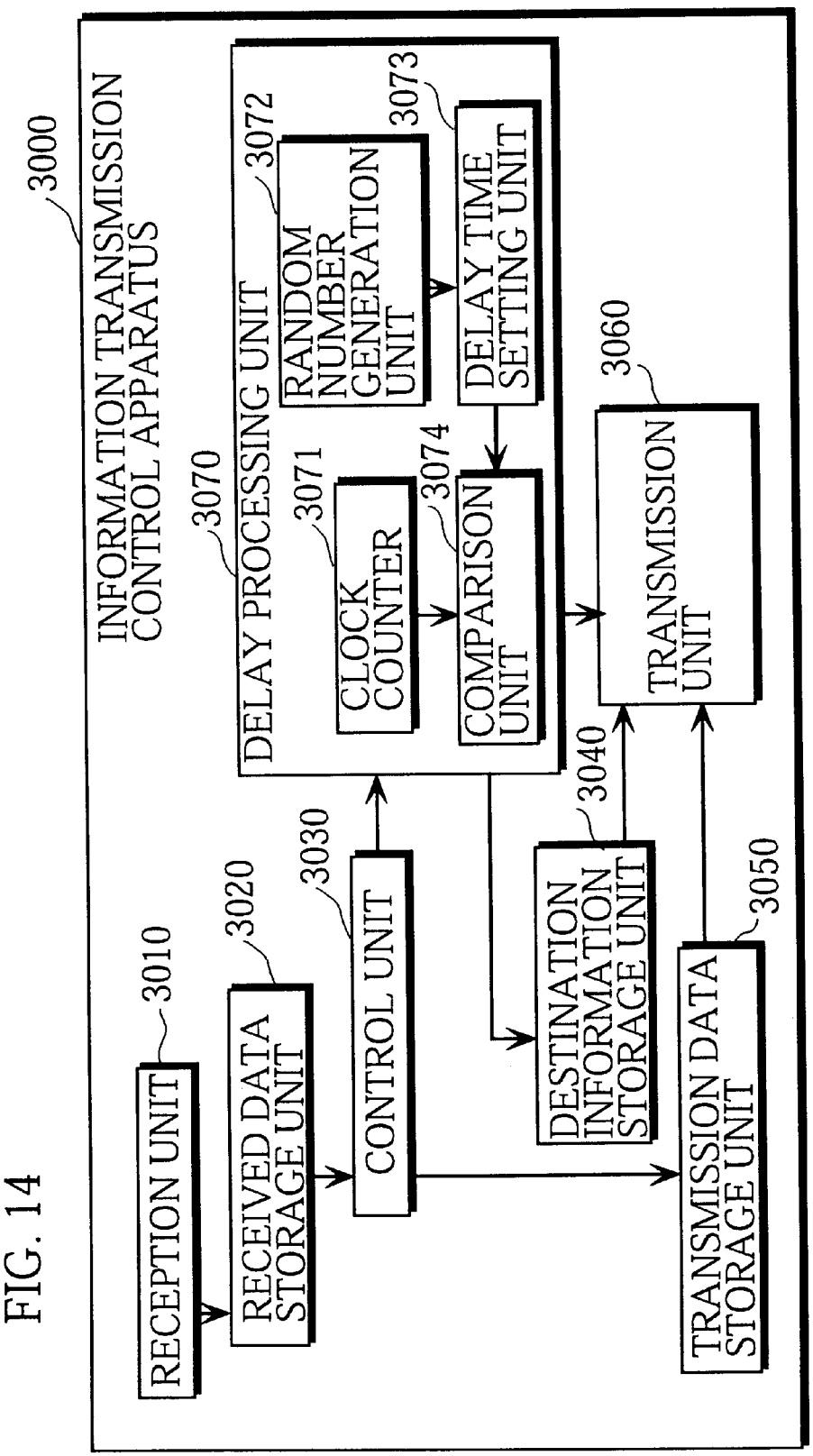
FIG. 14 shows the functional construction of the information transmission control apparatus 3000 of the third embodiment.

FIG. 14 shows the functional construction of the information transmission control apparatus 3000 of the third embodiment.

The information transmission control apparatus 3000 is a personal computer that is mainly made up of a CPU, a memory, and a hard disc.

Also, the information transmission control apparatus 3000 functionally includes a reception unit 3010, a received data storage unit 3020, a control unit 3030, a destination information storage unit 3040, a transmission data storage unit 3050, a transmission unit 3060, and a delay processing unit 3070.

The received data storage unit 3020, the destination information storage unit 3040, and the transmission data storage unit 3050 each correspond to an area of the memory.

The reception unit 3010 receives transmission data from the information provider apparatus 3200 via a communication line and stores it into the received data storage unit 3020.

The transmission unit 3060 transmits data stored in the transmission data storage unit 3050 to a destination shown by destination information stored in the destination information storage unit 3040, via a public telephone network or the like. The reception unit 3010 and the transmission unit 3060 are, for example, composed of an intelligent modem that is capable of automatic calling and answering.

The control unit 3030 is realized by the CPU executing the control program stored in the memory. The control unit 3030 refers to the received data in the received data storage unit 3020, stores data to be transmitted into the transmission data storage unit 3050, and gives a destination information set, that shows destinations, such as the telephone number "111–1111", of the data to be transmitted, to the delay processing unit 3070 according to the attribute "Destination-ID:" written in the received data.

The delay processing unit 3070 calculates delay time using a different random number for each destination shown by the destination information set received from the control unit 3030, and outputs a transmission instruction to the transmission unit 3060 when the delay time for any of the destinations has elapsed since it receives the destination information set. The delay processing unit 3070 is composed of a clock counter 3071, a random number generation unit 3072, a delay time setting unit 3073, and a comparison unit 3074.

The clock counter 3071 counts how much time has elapsed since the delay processing unit 3070 receives the destination information set. Here, the clock counter 3071 is incremented by 1 per second.

The random number generation unit 3072 generates pseudo-random numbers from 0 to 1 inclusive.

The delay time setting unit 3073 obtains random numbers corresponding to the number of destinations shown by the received destination information set, and calculates delay time for each destination by multiplying each random number by a predetermined value. The delay time setting unit 3073 then stores such calculated delay time for each destination. Here, the predetermined value is set at 1200.

The comparison unit 3074 repeatedly compares the delay time for each destination stored in the delay time setting unit 3073 with the elapsed time in the clock counter 3071. When delay time for any of the destinations has elapsed, the delay processing unit 3070 stores destination information that shows the destination corresponding to the elapsed delay time into the destination information storage unit 3040 and outputs a transmission instruction to the transmission unit 3060.

Here, transmission delay time for each destination takes on a random value within the range from 0 to 1200 seconds.

(Operation)

The operation of the information transmission control apparatus 3000 with the above functional construction is explained below.

Figure 15:
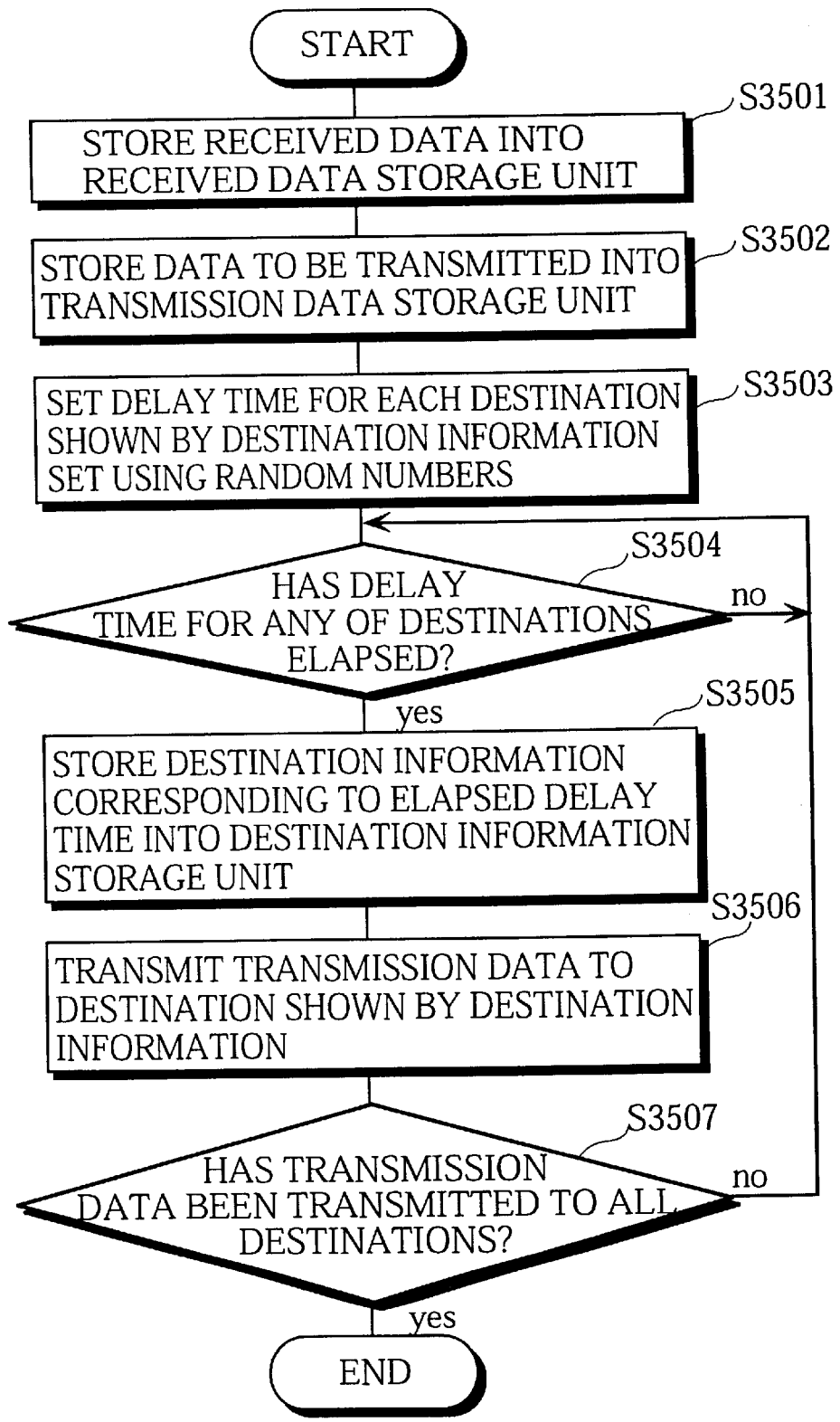
FIG. 15 is a flowchart showing the operation of the information transmission control apparatus 3000.

FIG. 15 is a flowchart showing the operation of the information transmission control apparatus 3000.

Here, the case is explained when the information transmission control apparatus 3000 receives the transmission data 3210 shown in FIG. 13 from the information provider apparatus 3200.

First, the transmission data is received by the reception unit 3010 and stored in the received data storage unit 3020 (Step S3501). Here, the transmission data 3210 shown in FIG. 13 is stored in the received data storage unit 3020.

Next, the following steps are performed by activating the control program "gw.cgi" specified in the received data.

The control unit 3030 refers to the received data in the received data storage unit 3020 and stores data to be transmitted to the information reception apparatuses 3100–3104 into the transmission data storage unit 3050 (Step S3502).

FIG. 16 shows an example of the transmission data stored in the transmission data storage unit 3050.

In the figure, transmission data 3051 differs with the transmission data 3210 shown in FIG. 13 only in that it does not include "PUSH http://www.pana-gw.co.jp/gw.cgi" and "Destination-ID: 111–1111, 111–22222, 111–3333, 111–4444, 111–5555".

The control unit 3030 then refers to the attribute "Destination-ID:" written in the received data and gives the destination information set to the delay processing unit 3070. The delay processing unit 3070 calculates and stores delay time for each destination shown by the destination information set using pseudo-random numbers generated by the random number generation unit 3072 (Step S3503).

Here, the delay time for the destination "111–1111" is set at 60 seconds, the delay time for the destination "111–2222" is set at 540 seconds, the delay time for the destination "111–3333" is set at 720 seconds, the delay time for the destination "111–4444" is set at 1080 seconds, and the delay time for the destination "111–5555" is set at 1200 seconds.

The comparison unit 3074 repeatedly compares the delay time for each destination stored in the delay time setting unit 3073 with the clock counter 3071 that is incremented per second. When delay time for any of the destinations has elapsed (Step S3504), the delay processing unit 3070 stores destination information corresponding to the elapsed delay time into the destination information storage unit 3040 (Step S3505) and outputs a transmission instruction to the transmission unit 3060.

On receiving the transmission instruction, the transmission unit 3060 transmits the transmission data stored in the transmission data storage unit 3050 to a destination shown by the destination information stored in the destination information storage unit 3040 (Step S3506).

As a result, the transmission data 3051 shown in FIG. 16 is transmitted to the destination "111–1111".

Until the delay time for all of the destinations stored in the delay time setting unit 3073 elapse since the delay processing unit 3070 receives the destination information set (Step S3507), the comparison unit 3074 repeatedly compares delay time for remaining destinations with the clock counter 3071.

Thus, Steps S3504–S3507 are repeated until the transmission data 3051 is successively transmitted to the destinations "111–2222", "111–3333", "111–4444", and "111–5555".

On completing the transmission to all of the destinations (Step S3507), the information transmission control apparatus 3000 ends its operation.

<Information Communication Timing>

Figure 17:
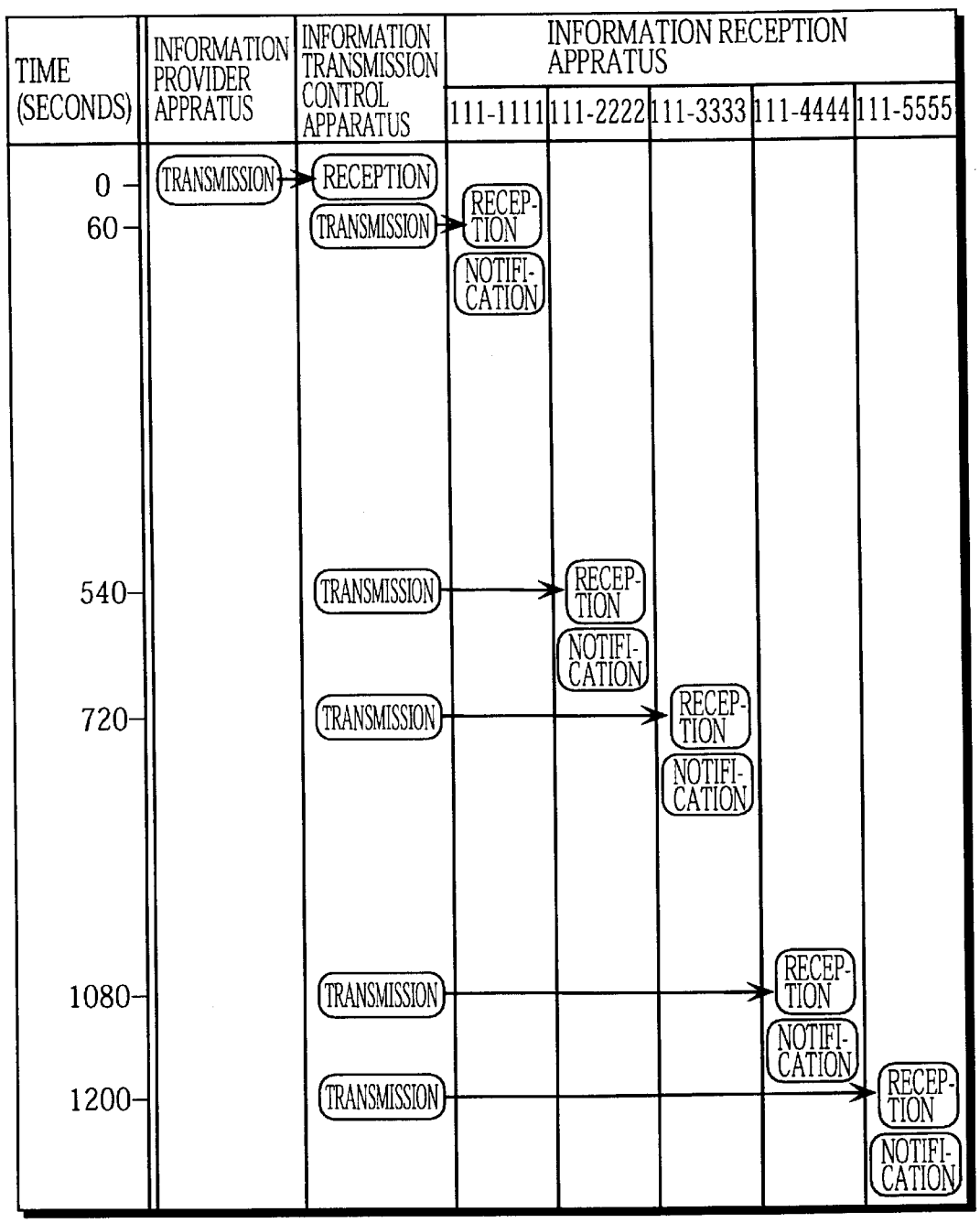
FIG. 17 is a time chart showing the transmission by the information provider apparatus, the relay transmission by the information transmission control apparatus, and the reception and notification by the plurality of information reception apparatuses.

FIG. 17 is a time chart showing the transmission by the information provider apparatus, the relay transmission by the information transmission control apparatus, and the reception and notification by the plurality of information reception apparatuses.

Here, on receiving data and a relay transmission instruction from the information provider apparatus 3200, the information transmission control apparatus 3000 performs the above transmission delay processing using random numbers to transmit information to the plurality of information reception apparatuses at different times.

By doing so, users of the plurality of information reception apparatuses are notified of the information reception at different times, so that the users' replies to the received information or requests for further information will not be made at the same time. Accordingly, it is possible to avoid the danger that concentration of replies causes the load exceeding the provider's instant processing capacity or the heavy traffic/breakdown in the communication lines.

Fourth Embodiment

The following is an explanation of the information transmission control apparatus of the fourth embodiment of the present invention.

Figure 18:
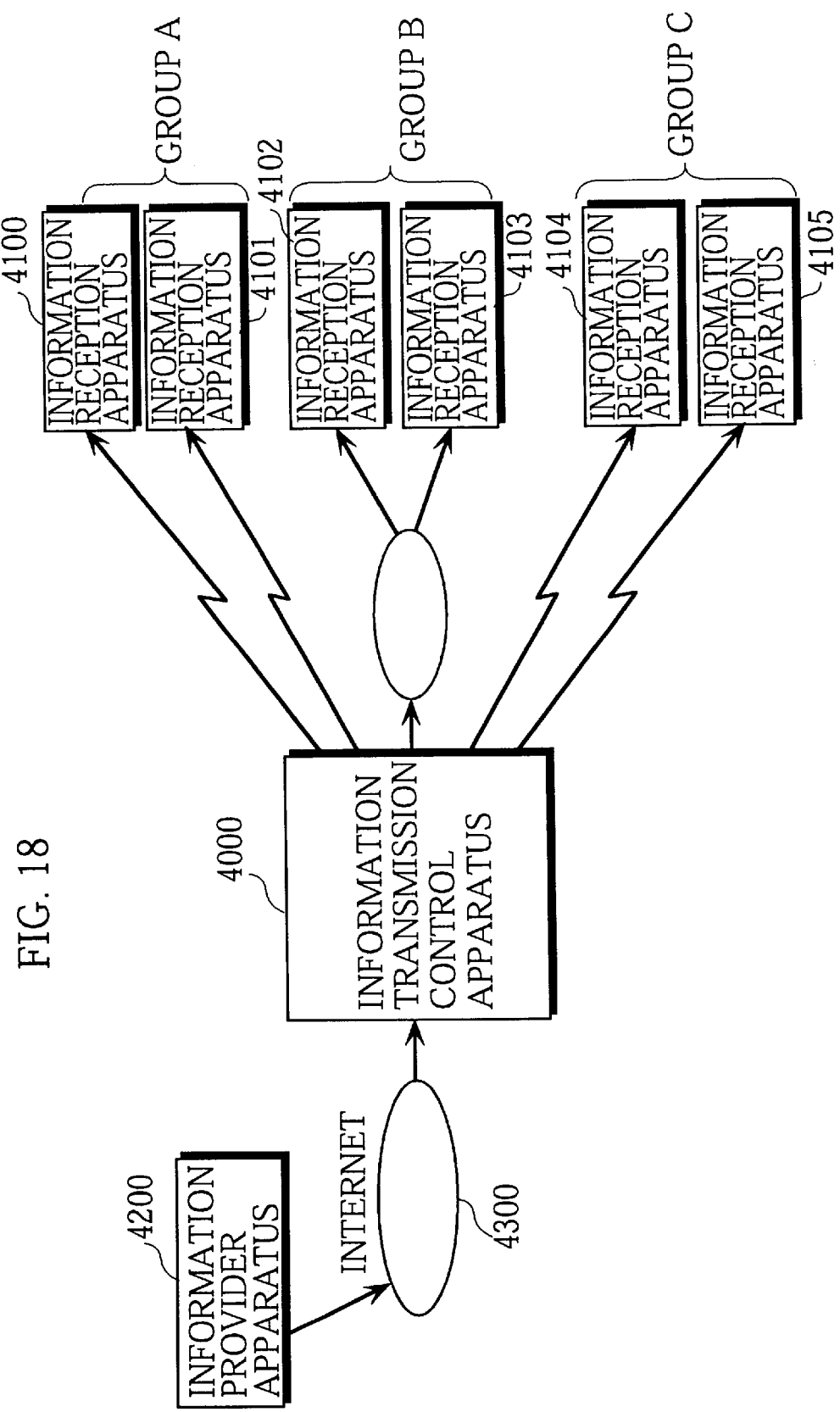
FIG. 18 shows a state when information from the information provider apparatus is transmitted to the plurality of information reception apparatuses via the information transmission control apparatus of the fourth embodiment of the present invention.

FIG. 18 shows a state when the information transmission control apparatus of the fourth embodiment relays information from an information provider apparatus to a plurality of information reception apparatuses.

Here, the information is transmitted from the information provider apparatus 4200 to the plurality of information reception apparatuses 4100–4105 in the directions of the arrows shown in the figure.

The information provider apparatus 4200 sends broadcast information and a broadcast instruction to the information transmission control apparatus 4000 via an internet 4300. The information transmission control apparatus 4000 operates as a relay server for broadcasting the received information to the information reception apparatuses 4100–4105 via a public telephone network or by radio.

The information reception apparatuses 4100–4105 are each a general-purpose personal computer or a portable remote terminal that operates as a browser to display the received information according to the HTTP. The information reception apparatuses 4100 and 4101 belong to group A, the information reception apparatuses 4102 and 4103 belong to group B, and the information reception apparatuses 4104 and 4105 belong to group C. Information reception apparatuses of the same group are simultaneously called to receive the information as in the second embodiment.

The information provider apparatus 4200 and the information transmission control apparatus 4000 are explained in detail below.

<Information Provider Apparatus>

The information provider apparatus 4200 is a personal computer or the like that sends transmission data to the information transmission control apparatus 4000 via the internet 4300, the transmission data including information to be broadcast to the plurality of information reception apparatuses 4100–4105 and a destination information set.

FIG. 19 shows an example of the transmission data sent from the information provider apparatus 4200 to the information transmission control apparatus 4000.

In the figure, transmission data 4210 roughly conforms to the HTTP but further includes "PUSH" and "Destination-ID". "PUSH" has already been explained in the third embodiment, where "gw.cgi" shows a name of a control program stored in the information transmission control apparatus 4000. The relay transmission is realized by the information transmission control apparatus 4000 executing this control program.

"Destination-ID: GroupA,GroupB;Delay=10 m, GroupC;Delay=20 m" in line 4212 shows a destination information set that associates each of three groups with transmission delay time. Here, the delay time for group A is 0 minute, the delay time for group B is 10 minutes, and the delay time for group C is 20 minutes.

Lines 4213–4214 and line group 4215 are the same as lines 3213–3214 and line group 3215 in the third embodiment and are not explained here.

<Information Transmission Control Apparatus>

(Construction)

Figure 20:
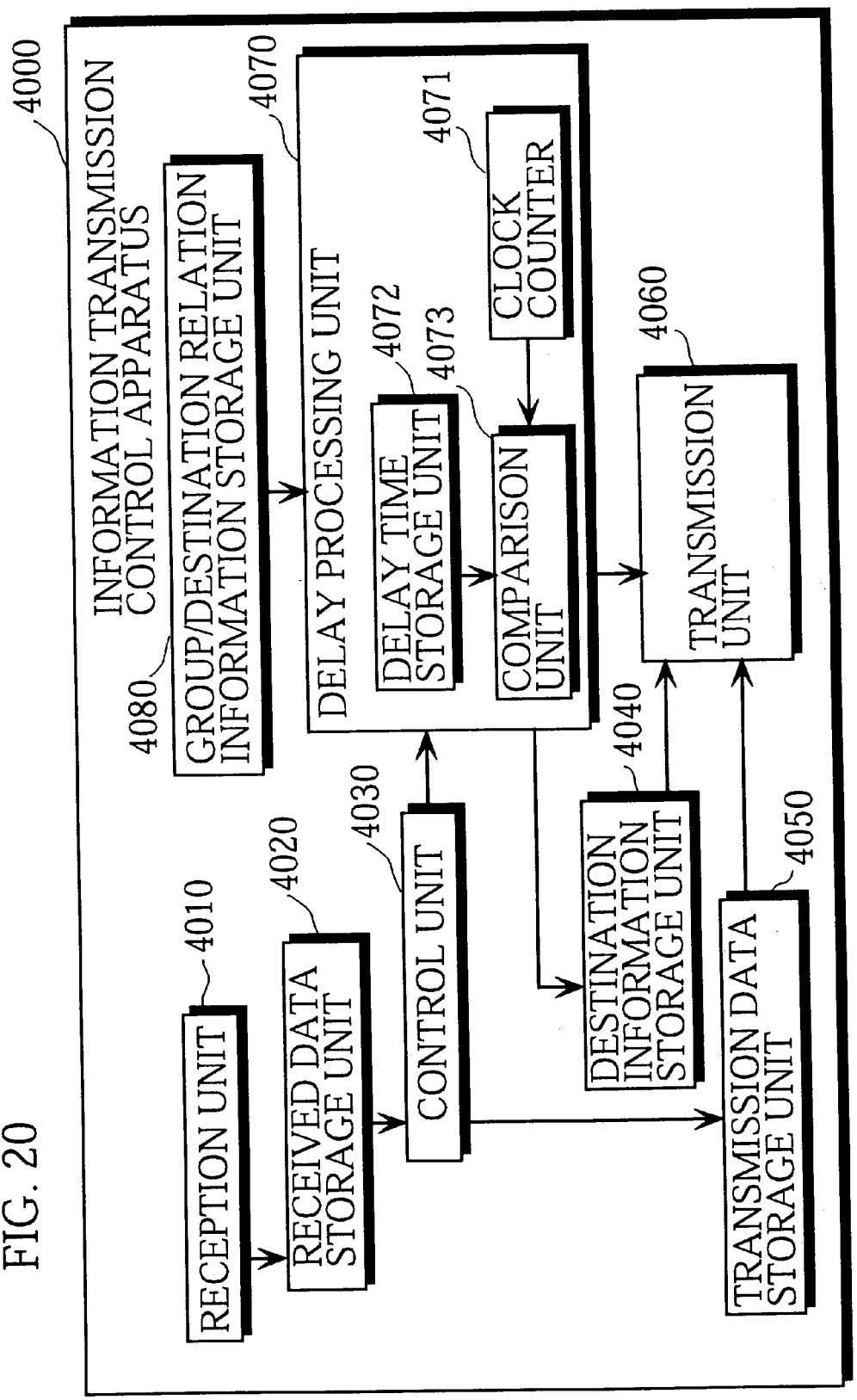
FIG. 20 shows the functional construction of the information transmission control apparatus 4000 of the fourth embodiment.

FIG. 20 shows the functional construction of the information transmission control apparatus 4000 of the fourth embodiment.

The information transmission control apparatus 4000 is a personal computer that is mainly made up of a CPU, a memory, and a hard disc.

The information transmission control apparatus 4000 functionally includes a reception unit 4010, a received data storage unit 4020, a control unit 4030, a destination information storage unit 4040, a transmission data storage unit 4050, a transmission unit 4060, a delay processing unit 4070, and a group/destination relation information storage unit 4080.

The received data storage unit 4020, the destination information storage unit 4040, and the transmission data storage unit 4050 each correspond to an area of the memory.

The reception unit 4010, the received data storage unit 4020, the destination information storage unit 4040, the transmission data storage unit 4050, and the transmission unit 4060 respectively correspond to the reception unit 3010, the received data storage unit 3020, the destination information storage unit 3040, the transmission data storage unit 3050, and the transmission unit 3060 in the information transmission control apparatus 3000 of the third embodiment and are not explained here.

The control unit 4030 is realized by the CPU executing the control program stored in the memory. The control unit 4030 refers to the received data stored in the received data storage unit 4020, stores data to be transmitted into the transmission data storage unit 4050, and gives combinations of each group ID and delay time, shown by the attribute "Destination-ID:" in the received data, to the delay processing unit 4070 as the destination information set. Note here that "Destination-ID:" specifies groups of information reception apparatuses as transmission destinations.

The delay processing unit 4070 receives the destination information set from the control unit 4030 and refers to the group/destination relation information storage unit 4080. Each time delay time that is associated with any of the group IDs has elapsed since receiving the destination information set, the delay processing unit 4070 stores destination information corresponding to the group ID into the destination information storage unit 4040 and outputs a transmission instruction to the transmission unit 4060. The delay processing unit 4070 is mainly made up of a clock counter 4071, a delay time storage unit 4072, and a comparison unit 4073.

The clock counter 4071 counts how much time has elapsed since the delay processing unit 4070 receives the destination information set. Here, the clock counter 4071 is incremented by 1 per minute.

The delay time storage unit 4072 stores the delay time received from the control unit 4030 that correspond to each group ID.

The comparison unit 4073 repeatedly compares the delay time for each group ID stored in the delay time storage unit 4072 with the elapsed time in the clock counter 4071 to judge whether delay time for any of the group IDs has elapsed.

The group/destination relation information storage unit 4080 stores correspondence information between each group ID, such as "GroupA", "GroupB", and "GroupC", and destination information, such as a telephone number or an IP address, for the group identified by the group ID. The transmission unit 4060 transmits the transmission data stored in the transmission data storage unit 4050 according to the above destination information. (Operation)

The operation of the information transmission control apparatus 4000 with the above functional construction is explained below.

Figure 21:
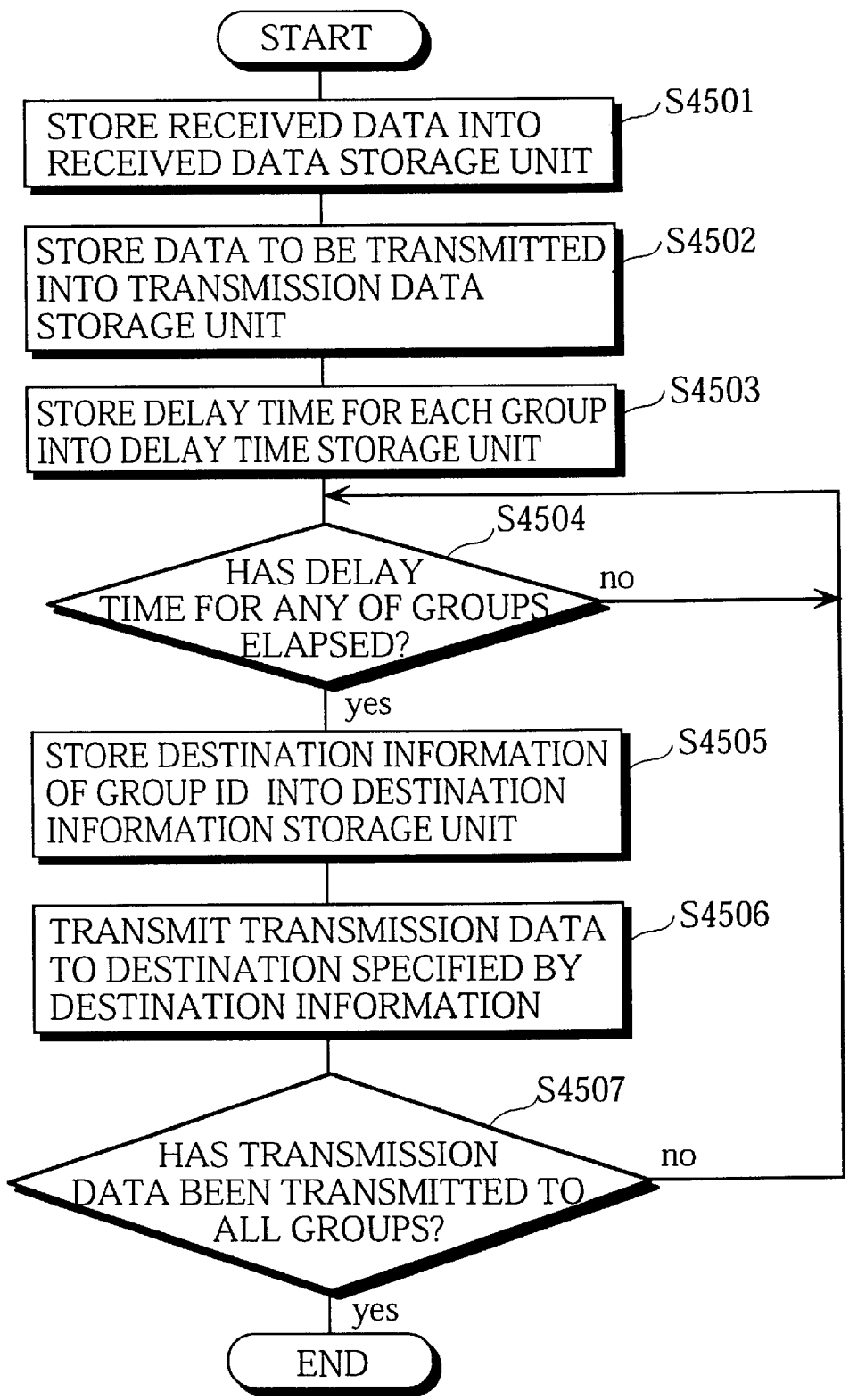
FIG. 21 is a flowchart showing the operation of the information transmission control apparatus 4000.

FIG. 21 is a flowchart showing the operation of the information transmission control apparatus 4000.

Here, the case is explained when the information transmission control apparatus 4000 receives the transmission data 4210 shown in FIG. 19 from the information provider apparatus 4200.

First, the transmission data is received by the reception unit 4010 and stored in the received data storage unit 4020 (Step S4501). Here, the transmission data 4210 shown in FIG. 19 is stored in the received data storage unit 4020.

Next, the following steps are performed by activating the control program "gw.cgi" specified in the received data.

The control unit 4030 refers to the received data in the received data storage unit 4020 and stores data that is to be transmitted to the plurality of information reception apparatuses 4100–4105 into the transmission data storage unit 4050 (Step S4502). Here, the transmission data same as that shown in FIG. 16 is stored in the transmission data storage unit 4050.

The control unit 4030 then refers to "Destination-ID:" written in the received data and gives combinations of each group ID and delay time to the delay processing unit 4070. Here, the combination of "GroupA" and delay time 0, the combination of "GroupB" and delay time 10 minutes, and the combination of "GroupC" and delay time 20 minutes are given to the delay processing unit 4070.

The delay processing unit 4070 stores the delay time corresponding to each group ID into the delay time storage unit 4072 (Step S4503).

Next, the comparison unit 4073 repeatedly compares the delay time for each group ID stored in the delay time storage unit 4072 with the clock counter 4071 that is incremented per minute. When delay time for any of the group IDs has elapsed (Step S4504), the delay processing unit 4070 refers to the group/destination relation information storage unit 4080, stores destination information for the group identified by the group ID into the destination information storage unit 4040 (Step S4505), and instructs the transmission unit 4060 to transmit the transmission data stored in the transmission data storage unit 4050 according to the destination information (Step S4506).

As a result, the transmission data 4210 is first transmitted to the information reception apparatuses 4100 and 4101 that belong to group A without a time delay.

The delay processing unit 4070 judges whether the transmission data has been transmitted to all of the groups (Step S4507). If so, the information transmission control apparatus 4000 ends its operation. If, on the other hand, the transmission data has not been transmitted to all of the groups, the processing returns to Step S4504, and Steps S4504–S4507 are repeated until delay time for remaining group IDs have elapsed.

As a result, the transmission data 4210 is transmitted to the information reception apparatuses 4102 and 4103 that belong to group B 10 minutes after the transmission to group A, and transmitted to the information reception apparatuses 4104 and 4105 that belong to group C 20 minutes after the transmission to group A.

<Information Communication Timing>

Figure 22:
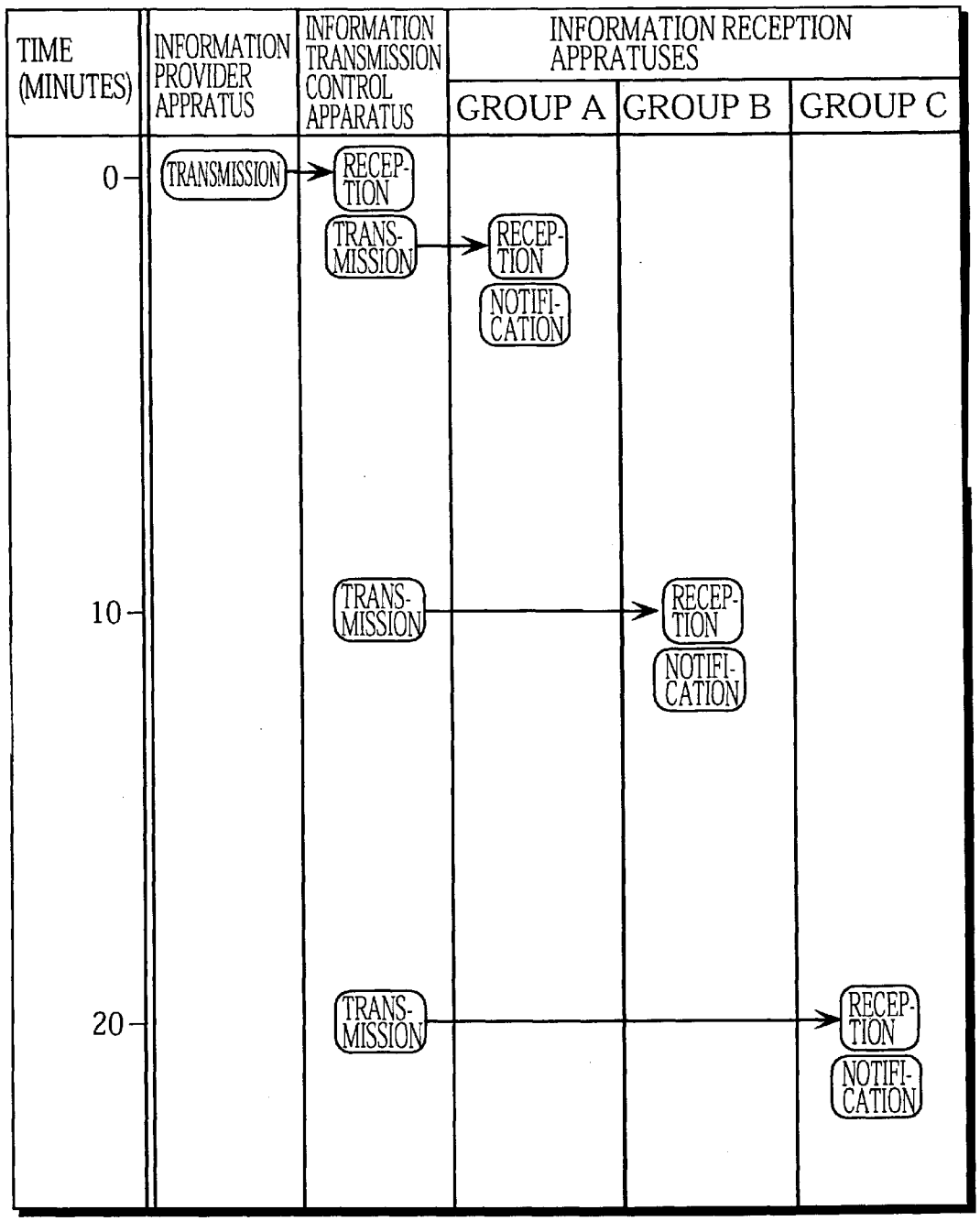
FIG. 22 is a time chart showing the transmission by the information provider apparatus, the relay transmission by the information transmission control apparatus, and the reception and notification by the plurality of information reception apparatuses.

FIG. 22 is a time chart showing the transmission by the information provider apparatus, the relay transmission by the information transmission control apparatus, and the reception and notification by the plurality of information reception apparatuses.

Here, on receiving the transmission data 4210 shown in FIG. 19 from the information provider apparatus, the information transmission control apparatus 4000 transmits information to the information reception apparatuses 4100, 4102 and 4104 which respectively belong to groups A, B, and C.

The information provider apparatus 4200 specifies in advance that the information be transmitted to the three information reception apparatuses at the different times.

As a result, the users of the information reception apparatuses 4100, 4102, and 4104 are notified of the information reception at the different times. Accordingly, the users' replies or requests for further information will be made at certain time intervals, so that the possibilities of the load exceeding the provider's instant processing capacity or the traffic jam in the communication lines can be reduced.

While the above embodiments have been explained as examples of achieving the effects of the invention, the present invention is not limited to such. For instance, the following modifications are possible.

(1) While the clock counter is used in the above embodiments, any circuits capable of counting the elapsed time can instead be used.

(2) While a random number is used to set the delay time for notifying the user of the reception in each information reception apparatus in the first embodiment, the random number may not necessarily be used as long as each information reception apparatus can delay the notification for a different time period after receiving broadcast information. For instance, each information reception apparatus may possess a different predetermined value in advance and perform fixed calculations on the predetermined value to obtain the delay time. Note here that the delay time for all of the information reception apparatuses may not necessarily be different. As long as at least two of the information reception apparatuses have different delay time, the concentration of the users' replies can be avoided.

(3) While the output control unit in each information reception apparatus has the output unit display the received information after notifying the user of the information reception in the first embodiment, the present invention is not limited to such. For instance, the output control unit may notify the user of the reception and wait until the user requests the display of the received information. Alternatively, the output control unit may notify the user of the reception by directly displaying the received information. The same modification applies to the other embodiments.

(4) While the random number generation unit in each information reception apparatus starts the random number generation when the delay processing unit is activated in the first embodiment, the random number generation unit may instead start the generation when the information reception apparatus is powered on. It is unlikely that the plurality of information reception apparatuses are simultaneously powered on, so that the random number generation is started at different times in the plurality of information reception apparatuses. In such a case, there is a high possibility that, at a given moment, a random number generated by the random number generation unit in one information reception apparatus is different from random numbers generated in the other information reception apparatuses, even if the same random number generation pattern is used in all information reception apparatuses. Accordingly, the users of the plurality of information reception apparatuses will be notified of the reception at different times. The unique information storage unit 1142 is not necessary in this case.

(5) While the information is broadcast from the information transmission control apparatus to the plurality of information reception apparatuses at little time intervals in FIG. 6 in the first embodiment, the information may instead be broadcast simultaneously. The simultaneous broadcast is possible either by using the group call function which is commonly used for pagers, by connecting the information transmission control apparatus to a plurality of communication channels, or by directly broadcasting the information from the information transmission control apparatus to the plurality of information reception apparatuses by radio. Also, the information transmission control apparatus may transmit the information simultaneously to at least two information reception apparatuses among the plurality of information reception apparatuses.

(6) While the delay time for one of the plurality of groups is specified in the transmission data in the second embodiment as shown in "Content-Direction: GroupB;Delay=10 m", delay time for each of the plurality of groups may also be specified.

Also, the group IDs are not limited to those used in the embodiments, such as "GroupA", "GroupB", and "GroupC". For example, the delay time can be specified by including "Content-Direction: Group1;Delay=10 m,Group2=20 m" in the transmission data. Here, "Group1" identifies a group of information reception apparatuses whose telephone numbers, when divided by 3, each leave the remainder 1, while "Group2" identifies a group of information reception apparatuses whose telephone numbers, when divided by 3, each leave the remainder 2. In this case, a telephone number is, for example, inputted in each information reception apparatus beforehand by the user.

Also, the information transmission control apparatus may not necessarily recognize which information reception apparatuses are included in each group.

Also, the delay time may be specified not for each group but for each information reception apparatus. In such a case, each information reception apparatus possesses a unique ID and the information transmission control apparatus sends transmission data that specifies the delay time for each ID. For example, a production number of each information reception apparatus may be inputted by the user and used as the unique ID.

(7) While the upper bound of the delay time is set at 1800 seconds and 1200 seconds respectively in the first and third embodiments, the present invention is not limited to such. Also, in the third embodiment, the information transmission control apparatus can change the upper bound according to the number of information reception apparatuses.

(8) While the delay time for each information reception apparatus is set using random numbers generated by the random number generation unit in the information transmission control apparatus in the third embodiment, the delay time may be set without using the random numbers. For instance, the consecutive numbers starting from 1 may be assigned to the plurality of information reception apparatuses, and delay time for the information reception apparatus n may be set at "10×(n−1)" minutes. By doing so, the delay time for each of the information reception apparatuses 1, 2, 3, . . . is set respectively at 0 minutes, 10 minutes, 20 minutes, . . . .

Here, the consecutive numbers may be assigned to the plurality of information reception apparatuses at random, or according to the order, or the reverse order, shown in "Destination-ID:" in the transmission data sent from the information provider apparatus. Alternatively, the information transmission control apparatus may set a fixed time interval between the transmission to one information reception apparatus and the transmission to the next information reception apparatus.

(9) While telephone numbers are used as destination information in the third embodiment, IP addresses may instead be used. Also, the information transmission control apparatus of the third embodiment may transmit the transmission data to more than one information reception apparatuses through one destination.

(10) In the fourth embodiment, the group/destination relation information storage unit stores the correspondence information between each group ID and a telephone number (IP address) of a group identified by the group ID. However, it is also possible to associate each group ID with a telephone number (IP address) of each information reception apparatus that belongs to the group identified by the group ID. In such a case, the information transmission control apparatus can separately transmit the transmission data to each information reception apparatus that belongs to the same group more or less at the same time.

(11) While the information transmission control apparatus transmits the transmission data to the plurality of information reception apparatuses via the public telephone network or by radio in the third and fourth embodiments, the transmission can instead be made via any wired or wireless data transmission lines.

(12) While the HTML document is transmitted to each information reception apparatus in the first and second embodiments, information of any other forms and contents may be transmitted as long as the contents of the information allow the receiver's reply. Here, the reply means to perform information communication using some kinds of communication means, and a request for further information is one of such information communication. A destination of the receiver's reply to the received information is not necessarily the information provider that provided the information to the receiver.

Also, each information reception apparatus may not necessarily be a browser, as long as it can receive the information from the information transmission control apparatus.

As one example, each information reception apparatus may be a pager that displays the received information after a certain time delay, and the information transmission control apparatus may broadcast a text message to the plurality of pagers. When 100 pagers simultaneously receive the text message "Call 999–9999 as soon as possible!", the text message is displayed in these pagers at different times. Accordingly, the users of these pagers will not call the number 999–9999 at the same time, so that the heavy traffic in the communication lines can be avoided.

(13) Any of the control operations of the information reception apparatus (shown in FIGS. 5 and 10) and the control operations of the information transmission control apparatus (shown in FIGS. 15 and 21) in the above embodiments can be realized by a machine language program. Such a machine language program may be written in a storage medium, such as an IC card, an optical memory disc, a flexible disc, or a ROM, and distributed on the market. The control operation is realized by installing the storage medium into the memory of the information reception apparatus or the information transmission control apparatus and executing the machine language program in the storage medium by the CPU.

Also, such a machine language program, or a high-level language program that can be compiled to the machine language program, may be distributed on-line through storage mediums (such as hard discs) or communication lines.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An information transmission control apparatus for relaying broadcast information from an information provider apparatus to a plurality of information reception apparatuses, wherein the broadcast information allows a user of each of the plurality of information reception apparatuses to reply to the broadcast information, the information transmission control apparatus comprising:

a memory;

reception means for receiving the broadcast information from the information provider apparatus and storing the broadcast information into the memory;

delay time determination means for determining transmission delay time for each of a plurality of destinations so that transmission delay time is different for at least two destinations, the transmission delay time being a time period that is to elapse before transmitting the broadcast information to each of the plurality of destinations, and each of the plurality of destinations being at least one of the plurality of information reception apparatuses;

delay time elapse detection means for detecting whether the transmission delay time determined for each of the plurality of destinations has elapsed, after the broadcast information is received by the reception means; and transmission means for transmitting, each time the delay time elapse detection means detects that transmission delay time for one of the plurality of destinations has elapsed, the broadcast information to at least one information reception apparatus which is the destination, wherein the delay time determination means includes:

a random number generation unit for generating random numbers, and wherein the delay time determination means determines the transmission delay time for each of the plurality of destinations based on the random numbers generated by the random number generation unit.

2. The information transmission control apparatus of claim 1, wherein the broadcast information is an HTML document including link information to other documents located on a WWW.

3. The information transmission control apparatus of claim 1, wherein each of the plurality of destinations is at least two of the plurality of information reception apparatuses, and wherein, each time the delay time elapse detection means detects that the transmission delay time for one of the plurality of destinations has elapsed, the transmission means transmits the broadcast information to information reception apparatuses which are the destination.

4. An information transmission control apparatus for relaying broadcast information from an information provider apparatus to a plurality of information reception apparatuses, wherein the broadcast information allows a user of each of the plurality of information reception apparatuses to reply to the broadcast information, the information transmission control apparatus comprising:

a memory;

reception means for receiving the broadcast information from the information provider apparatus and storing the broadcast information into the memory;

delay time determination means for determining transmission delay time for each of a plurality of destinations so that transmission delay time is different for at least two destinations, the transmission delay time being a time period that is to elapse before transmitting the broadcast information to each of the plurality of destinations, and each of the plurality of destinations being at least one of the plurality of information reception apparatuses;

delay time elapse detection means for detecting whether the transmission delay time determined for each of the plurality of destinations has elapsed, after the broadcast information is received by the reception means; and transmission means for transmitting, each time the delay time elapse detection means detects that transmission delay time for one of the plurality of destinations has elapsed, the broadcast information to at least one information reception apparatus which is the destinatin, wherein the delay time determination means includes:

a transmission order determination unit for determining a transmission order for the plurality of destinations; and a time interval storage unit for storing a predetermined time period, and wherein the delay time determination means determines the transmission delay time for each of the plurality of destinations so that transmission delay time for an "n"th destination in the transmission order, among the plurality of destinations, is set at "(the predetermined time period)×(n−1)", "n" being an integer no less than 1.

5. An information transmission control apparatus for relaying broadcast information from an information provider apparatus to a plurality of information reception apparatuses, wherein the broadcast information allows a user of each of the plurality of information reception apparatuses to reply to the broadcast information, the information transmission control apparatus comprising:

a memory;

reception means for receiving the broadcast information from the information provider apparatus and storing the broadcast information into the memory;

unique information storage means for storing unique information that differs from at least one of the other information reception apparatuses which receive the broadcast information;

delay time determination means for determining a transmission delay time for each of a plurality of destinations based on the unique information so that transmission delay time is different for at least two destinations, the transmission delay time being a time period that is to elapse before transmitting the broadcast information to each of the plurality of destinations, and each of the plurality of destinations being at least one of the plurality of information reception apparatuses;

delay time elapse detection means for detecting whether the transmission delay time determined for each of the plurality of destinations has elapsed, after the broadcast information is received by the reception means;

notification means for notifying the user of the reception of the broadcast information when the delay time elapse detection means detects that the determined time has elapsed; and transmission means for transmitting, each time the delay time elapse detection means detects that transmission delay time for one of the plurality of destinations has elapsed, the broadcast information to at least one information reception apparatus which is the destination, wherein the time determined by the delay time determination means is changeable, wherein the unique information is a set of identification information, wherein the information reception apparatus receives delay specification information from the information transmission control apparatus along with the broadcast information, the delay specification information being at least one set of correspondence information between a set of specification information for specifying a notification delay time and a set of identification information for identifying at least one information reception apparatus, the notification delay time being a time period that is to elapse before notifying a user of a reception of the broadcast information, wherein the information reception apparatus further comprises delay specification information reception means for receiving the delay specification information from the information transmission control apparatus and storing the delay specification information into the memory, and wherein the delay time determination means refers to the delay specification information and determines the time according to a set of specification information which corresponds to the set of identification information stored in the unique information storage means.

6. The information transmission control apparatus of claim 5, wherein the broadcast information is an HTML document including link information to other documents on a global communication network.

7. The information transmission control apparatus of claim 6, further comprising:

display means for displaying the broadcast information after the notification means notifies the user of the reception of the broadcast information.

8. An information transmission control apparatus for relaying broadcast information from an information provider apparatus to a plurality of information reception apparatuses, wherein the broadcast information allows a user of each of the plurality of information reception apparatuses to reply to the broadcast information, the information transmission control apparatus comprising:

a memory;

reception means for receiving the broadcast information from the information provider apparatus and storing the broadcast information into the memory;

unique information storage means for storing unique information that differs from at least one of the other information reception apparatuses which receive the broadcast information;

delay time determination means for determining a transmission delay time for each of a plurality of destinations based on the unique information so that transmission delay time is different for at least two destinations, the transmission delay time being a time period that is to elapse before transmitting the broadcast information to each of the plurality of destinations, and each of the plurality of destinations being at least one of the plurality of information reception apparatuses;

delay time elapse detection means for detecting whether the transmission delay time determined for each of the plurality of destinations has elapsed, after the broadcast information is received by the reception means;

notification means for notifying the user of the reception of the broadcast information when the delay time elapse detection means detects that the determined time has elapsed; and transmission means for transmitting, each time the delay time elapse detection means detects that transmission delay time for one of the plurality of destinations has elapsed, the broadcast information to at least one information reception apparatus which is the destination, wherein the delay time determination means includes:

a random number generation unit for generating random numbers using the unique information, and wherein the delay time determination means determines the time based on one of the random numbers generated by the random number generation unit.

9. The information transmission control apparatus of claim 8, further comprising:

delay specification information reception means for receiving, when delay specification information is transmitted from the information transmission control apparatus along with the broadcast information, the delay specification information and storing the delay specification information into the memory, the delay specification information instructing the information reception apparatus to delay notifying the user of the reception of the broadcast information, wherein after the broadcast information is received by the reception means, if the delay specification information is stored in the memory, the notification means notifies the user of the reception when the delay time elapse detection means detects that the determined time has elapsed, while if the delay specification information is not stored in the memory, the notification means notifies the user of the reception without a time delay.

10. The information transmission control apparatus of claim 8, wherein the broadcast information is simultaneously transmitted from the information transmission control apparatus to a plurality of information reception apparatuses including the information reception apparatus.

11. An information transmission control apparatus for relaying broadcast information from an information provider apparatus to a plurality of information reception apparatuses, wherein the broadcast information allows a user of each of the plurality of information reception apparatuses to reply to the broadcast information, the information transmission control apparatus comprising:

transmission information storage means for storing the broadcast information from the information provider apparatus;

delay time determination means for determining transmission delay time for each of a plurality of destinations so that transmission delay time is different for at least two destinations, the transmission delay time being a time period that is to elapse before transmitting the broadcast information to each of the plurality of destinations, and each of the plurality of destinations being at least one of the plurality of information reception apparatuses;

delay specification information storage means for storing delay specification information that specifies notification delay time for each of the plurality of information reception apparatuses, the notification delay time being a time period that is to elapse before each of the plurality of information reception apparatuses notifies the user of a reception of the broadcast information;

delay time elapse detection means for detecting whether the transmission delay time determined for each of the plurality of destinations has elapsed, after the broadcast information is received by the storage means; and transmission means for transmitting, each time the delay time elapse detection means detects that transmission delay time for one of the plurality of destinations has elapsed, the broadcast information stored in the transmission information storage means and the delay specification information stored in the delay specification information storage means to the plurality of information reception apparatuses.

12. The information transmission control apparatus of claim 11, wherein the broadcast information is an HTML document that includes link information to other documents located on a WWW.

13. The information transmission control apparatus of claim 11, wherein the transmission means simultaneously transmits the broadcast information and the delay specification information to the plurality of information reception apparatuses.

14. An information transmission control apparatus for relaying broadcast information from an information provider apparatus to a plurality of information reception apparatuses, wherein the broadcast information allows a user of each of the plurality of information reception apparatuses to reply to the broadcast information, the information transmission control apparatus comprising:

transmission information storage unit for storing the broadcast information from the information provider apparatus;

delay time determination unit for determining a transmission delay time for each of a plurality of destinations so that transmission delay time is different for at least two destinations, the transmission delay time being a time period that is to elapse before transmitting the broadcast information to each of the plurality of destinations, and each of the plurality of destinations being at least one of the plurality of information reception apparatuses;

delay specification information storage unit for storing delay specification information that specifies notification delay time for each of the plurality of information reception apparatuses, the notification delay time being a time period that is to elapse before each of the plurality of information reception apparatuses notifies the user of a reception of the broadcast information;

delay time elapse detection unit for detecting whether the transmission delay time determined for each of the plurality of destinations has elapsed, after the broadcast information is received by the storage unit; and transmission unit for transmitting, each time the delay time elapse detection unit detects that transmission delay time for one of the plurality of destinations has elapsed, the broadcast information stored in the transmission information storage unit and the delay specification information stored in the delay specification information storage means to the plurality of information reception apparatuses.

15. The information transmission control apparatus of claim 14, wherein the broadcast information is an HTML document that includes link information to other documents located on a WWW.

16. The information transmission control apparatus of claim 14, wherein the transmission unit simultaneously transmits the broadcast information and the delay specification information to the plurality of information reception apparatuses.

* * * * *